United States Patent
Affinito et al.

(10) Patent No.: US 9,548,492 B2
(45) Date of Patent: Jan. 17, 2017

(54) PLATING TECHNIQUE FOR ELECTRODE

(75) Inventors: John D. Affinito, Tucson, AZ (US); Chariclea Scordilis-Kelley, Tucson, AZ (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 1164 days.

(21) Appl. No.: 13/524,662

(22) Filed: Jun. 15, 2012

(65) Prior Publication Data

US 2013/0017441 A1  Jan. 17, 2013

Related U.S. Application Data

(60) Provisional application No. 61/498,339, filed on Jun. 17, 2011.

(51) Int. Cl.
| | |
|---|---|
| H01M 4/04 | (2006.01) |
| H01M 4/38 | (2006.01) |
| H01M 2/16 | (2006.01) |
| H01M 4/134 | (2010.01) |
| H01M 4/36 | (2006.01) |

(Continued)

(52) U.S. Cl.
CPC ........... *H01M 4/382* (2013.01); *H01M 2/1673* (2013.01); *H01M 4/134* (2013.01); *H01M 4/366* (2013.01); *H01M 4/405* (2013.01); *H01M 4/667* (2013.01); *H01M 10/0468* (2013.01); *H01M 10/052* (2013.01); *H01M 2004/027* (2013.01);

(Continued)

(58) Field of Classification Search
None
See application file for complete search history.

(56) References Cited

U.S. PATENT DOCUMENTS

| 1,956,243 A | 4/1934 | McEachron et al. |
|---|---|---|
| 3,716,409 A | 2/1973 | Cairns et al. |

(Continued)

FOREIGN PATENT DOCUMENTS

| CN | 1121264 A | 4/1996 |
|---|---|---|
| CN | 1430304 A | 7/2003 |

(Continued)

OTHER PUBLICATIONS

International Preliminary Report on Patentability mailed Jan. 3, 2014 for Application No. PCT/US2012/042694.

(Continued)

*Primary Examiner* — Patrick Ryan
*Assistant Examiner* — Haixia Zhang
(74) *Attorney, Agent, or Firm* — Wolf, Greenfield & Sacks, P.C.

(57) ABSTRACT

Articles and methods for forming protected electrodes for use in electrochemical cells, including those for use in rechargeable lithium batteries, are provided. In some embodiments, the articles and methods involve an electrode that does not include an electroactive layer, but includes a current collector and a protective structure positioned directly adjacent the current collector, or separated from the current collector by one or more thin layers. Lithium ions may be transported across the protective structure to form an electroactive layer between the current collector and the protective structure. In some embodiments, an anisotropic force may be applied to the electrode to facilitate formation of the electroactive layer.

20 Claims, 2 Drawing Sheets

(51) Int. Cl.
*H01M 4/40* (2006.01)
*H01M 4/66* (2006.01)
*H01M 10/04* (2006.01)
*H01M 10/052* (2010.01)
*H01M 4/02* (2006.01)

(52) U.S. Cl.
CPC ..... *H01M 2300/0094* (2013.01); *Y02E 60/122* (2013.01)

(56) References Cited

U.S. PATENT DOCUMENTS

| | | |
|---|---|---|
| 3,833,421 A | 9/1974 | Rubischko et al. |
| 3,907,579 A | 9/1975 | Ravault |
| 3,951,689 A | 4/1976 | Ludwig |
| 3,957,532 A | 5/1976 | Settle et al. |
| 4,002,492 A | 1/1977 | Rao |
| 4,011,374 A | 3/1977 | Kaun |
| 4,056,885 A | 11/1977 | Rao |
| 4,063,005 A | 12/1977 | Mamantov et al. |
| 4,169,120 A | 9/1979 | Miller |
| 4,184,013 A | 1/1980 | Weddigen et al. |
| 4,235,528 A | 11/1980 | Yano et al. |
| 4,330,601 A | 5/1982 | Dey |
| 4,339,325 A | 7/1982 | Solomon et al. |
| 4,384,029 A | 5/1983 | Kordesch et al. |
| 4,410,609 A | 10/1983 | Peled et al. |
| 4,517,265 A | 5/1985 | Belanger et al. |
| 4,556,618 A | 12/1985 | Shia |
| 4,652,506 A | 3/1987 | Belanger et al. |
| 4,664,991 A | 5/1987 | Perichaud et al. |
| 4,677,415 A | 6/1987 | Howng |
| 4,683,178 A | 7/1987 | Stadnick et al. |
| 4,690,840 A | 9/1987 | Gauthier et al. |
| 4,739,018 A | 4/1988 | Armand et al. |
| 4,770,956 A | 9/1988 | Knoedler |
| 4,794,060 A | 12/1988 | Belanger et al. |
| 4,833,048 A | 5/1989 | Dejonghe et al. |
| 4,917,974 A | 4/1990 | Dejonghe et al. |
| 4,954,371 A | 9/1990 | Yializis |
| H858 H | 12/1990 | Leonard et al. |
| 5,126,082 A | 6/1992 | Frank |
| 5,162,175 A | 11/1992 | Visco et al. |
| 5,194,341 A | 3/1993 | Bagley et al. |
| 5,278,005 A | 1/1994 | Yamauchi et al. |
| 5,314,765 A | 5/1994 | Bates |
| 5,324,599 A | 6/1994 | Oyama et al. |
| 5,328,946 A | 7/1994 | Tuminello et al. |
| 5,366,829 A | 11/1994 | Saidi |
| 5,387,479 A | 2/1995 | Koksbang |
| 5,415,954 A | 5/1995 | Gauthier |
| 5,433,917 A | 7/1995 | Srivastava et al. |
| 5,434,021 A | 7/1995 | Fauteux et al. |
| 5,441,831 A | 8/1995 | Okamoto et al. |
| 5,460,905 A | 10/1995 | Skotheim |
| 5,462,566 A | 10/1995 | Skotheim |
| 5,487,959 A | 1/1996 | Koksbang |
| 5,516,598 A | 5/1996 | Visco et al. |
| 5,528,920 A | 6/1996 | Bouchard et al. |
| 5,529,860 A | 6/1996 | Skotheim et al. |
| 5,532,083 A | 7/1996 | McCullough |
| 5,538,812 A | 7/1996 | Lee et al. |
| 5,569,520 A | 10/1996 | Bates |
| 5,582,623 A | 12/1996 | Chu |
| 5,601,947 A | 2/1997 | Skotheim et al. |
| 5,614,331 A | 3/1997 | Takeuchi et al. |
| 5,620,792 A | 4/1997 | Challener |
| 5,648,187 A | 7/1997 | Skotheim et al. |
| 5,681,615 A | 10/1997 | Affinito et al. |
| 5,686,201 A | 11/1997 | Chu |
| 5,690,702 A | 11/1997 | Skotheim et al. |
| 5,693,432 A | 12/1997 | Matsumoto |
| 5,698,339 A | 12/1997 | Kawakami et al. |
| 5,716,736 A | 2/1998 | Zhang et al. |
| 5,723,230 A | 3/1998 | Naoi et al. |
| 5,731,104 A | 3/1998 | Ventura et al. |
| 5,783,330 A | 7/1998 | Naoi et al. |
| 5,786,092 A | 7/1998 | Lorenzo et al. |
| 5,792,575 A | 8/1998 | Naoi et al. |
| 5,814,420 A | 9/1998 | Chu |
| 5,824,434 A | 10/1998 | Kawakami et al. |
| 5,834,137 A | 11/1998 | Zhang et al. |
| 5,837,401 A | 11/1998 | Gauthier et al. |
| 5,882,819 A | 3/1999 | Naoi et al. |
| 5,895,732 A | 4/1999 | Clough |
| 5,919,587 A | 7/1999 | Mukherjee et al. |
| 5,961,672 A | 10/1999 | Skotheim et al. |
| 5,989,467 A | 11/1999 | Daws et al. |
| 5,998,063 A | 12/1999 | Kobayashi et al. |
| 6,019,801 A | 2/2000 | Gauthier et al. |
| 6,020,412 A | 2/2000 | Muschelewicz et al. |
| 6,025,094 A | 2/2000 | Visco et al. |
| 6,030,720 A | 2/2000 | Chu et al. |
| 6,066,417 A | 5/2000 | Cho et al. |
| 6,110,417 A | 8/2000 | Sugikawa |
| 6,110,621 A | 8/2000 | Sandi et al. |
| 6,117,590 A | 9/2000 | Skotheim et al. |
| 6,120,930 A | 9/2000 | Rouillard et al. |
| 6,136,468 A | 10/2000 | Mitchell, Jr. et al. |
| 6,143,216 A | 11/2000 | Loch et al. |
| 6,153,337 A | 11/2000 | Carlson et al. |
| 6,156,395 A | 12/2000 | Zhang et al. |
| 6,165,645 A | 12/2000 | Nishimura et al. |
| 6,168,694 B1 | 1/2001 | Huang et al. |
| 6,183,901 B1 | 2/2001 | Ying et al. |
| 6,200,704 B1 | 3/2001 | Katz et al. |
| 6,201,100 B1 | 3/2001 | Gorkovenko et al. |
| 6,202,591 B1 | 3/2001 | Witzman et al. |
| 6,203,947 B1 | 3/2001 | Peled et al. |
| 6,214,061 B1 | 4/2001 | Visco et al. |
| 6,225,002 B1 | 5/2001 | Nimon et al. |
| 6,268,695 B1 | 7/2001 | Affinito |
| 6,276,355 B1 | 8/2001 | Zhang et al. |
| 6,277,514 B1 | 8/2001 | Ying et al. |
| 6,284,412 B1 | 9/2001 | Minakata et al. |
| 6,306,545 B1 | 10/2001 | Carlson et al. |
| 6,328,770 B1 | 12/2001 | Gozdz |
| 6,358,643 B1 | 3/2002 | Katz et al. |
| 6,395,423 B1 | 5/2002 | Kawakami et al. |
| 6,402,795 B1 | 6/2002 | Chu et al. |
| 6,403,261 B2 | 6/2002 | Mitkin et al. |
| 6,413,284 B1 | 7/2002 | Chu et al. |
| 6,413,645 B1 | 7/2002 | Graff et al. |
| 6,508,921 B1 | 1/2003 | Mu et al. |
| 6,517,590 B1 | 2/2003 | Gauthier et al. |
| 6,517,968 B2 | 2/2003 | Johnson et al. |
| 6,528,211 B1 | 3/2003 | Nishimura et al. |
| 6,537,701 B1 | 3/2003 | Nimon et al. |
| 6,558,847 B1 | 5/2003 | Kawakami et al. |
| 6,570,325 B2 | 5/2003 | Graff et al. |
| 6,680,013 B1 | 1/2004 | Stein et al. |
| 6,706,449 B2 | 3/2004 | Mikhaylik et al. |
| 6,723,140 B2 | 4/2004 | Chu et al. |
| 6,733,924 B1 | 5/2004 | Skotheim et al. |
| 6,753,036 B2 | 6/2004 | Jankowski et al. |
| 6,770,187 B1 | 8/2004 | Putter et al. |
| 6,797,428 B1 | 9/2004 | Skotheim et al. |
| 6,835,493 B2 | 12/2004 | Zhang et al. |
| 6,852,139 B2 | 2/2005 | Zhang et al. |
| 6,854,312 B2 | 2/2005 | Laliberte et al. |
| 6,886,240 B2 | 5/2005 | Zhang et al. |
| 6,913,998 B2 | 7/2005 | Jankowski et al. |
| 6,914,111 B2 | 7/2005 | Mukoyama et al. |
| 6,936,381 B2 | 8/2005 | Skotheim et al. |
| 6,991,662 B2 | 1/2006 | Visco et al. |
| 7,019,494 B2 | 3/2006 | Mikhaylik |
| 7,029,796 B2 | 4/2006 | Choi et al. |
| 7,129,005 B2 | 10/2006 | Wensley et al. |
| 7,141,281 B2 | 11/2006 | Hirota et al. |
| 7,157,185 B2 | 1/2007 | Marple |
| 7,204,862 B1 | 4/2007 | Zhang et al. |
| 7,241,535 B2 | 7/2007 | Kim et al. |
| 7,244,530 B2 | 7/2007 | Hambitzer et al. |
| 7,247,408 B2 | 7/2007 | Skotheim et al. |

(56) References Cited

U.S. PATENT DOCUMENTS

| | | |
|---|---|---|
| 7,250,233 B2 | 7/2007 | Choi et al. |
| 7,354,675 B2 | 4/2008 | Molter |
| 7,354,680 B2 | 4/2008 | Mikhaylik |
| 7,358,012 B2 | 4/2008 | Mikhaylik |
| 7,361,431 B2 | 4/2008 | Kim et al. |
| 7,553,584 B2 | 6/2009 | Chiang et al. |
| 7,553,590 B2 | 6/2009 | Mikhaylik |
| 7,579,112 B2 | 8/2009 | Chiang et al. |
| 7,629,083 B2 | 12/2009 | Cho et al. |
| 7,646,171 B2 | 1/2010 | Mikhaylik |
| 7,771,870 B2 | 8/2010 | Affinito et al. |
| 7,785,730 B2 | 8/2010 | Affinito et al. |
| 7,842,421 B2 | 11/2010 | Mikhaylik |
| 8,076,024 B2 | 12/2011 | Affinito et al. |
| 8,087,309 B2 | 1/2012 | Kelley et al. |
| 8,105,717 B2 | 1/2012 | Skotheim et al. |
| 8,137,525 B1 | 3/2012 | Harreld et al. |
| 8,197,971 B2 | 6/2012 | Skotheim et al. |
| 8,338,034 B2 | 12/2012 | Affinito et al. |
| 8,415,054 B2 | 4/2013 | Skotheim et al. |
| 8,936,870 B2 | 1/2015 | Affinito et al. |
| 9,040,197 B2 | 5/2015 | Affinito et al. |
| 9,105,938 B2 | 8/2015 | Scordilis-Kelley et al. |
| 2001/0014420 A1 | 8/2001 | Takeuchi et al. |
| 2001/0024749 A1 | 9/2001 | Michot et al. |
| 2001/0034934 A1 | 11/2001 | Xu et al. |
| 2001/0041294 A1* | 11/2001 | Chu .............. H01M 4/045 429/231.9 |
| 2002/0006552 A1 | 1/2002 | Ishida et al. |
| 2002/0012846 A1 | 1/2002 | Skotheim et al. |
| 2002/0018933 A1 | 2/2002 | Mitkin et al. |
| 2002/0071989 A1 | 6/2002 | Verma |
| 2002/0119351 A1 | 8/2002 | Ovshinsky et al. |
| 2002/0182508 A1 | 12/2002 | Nimon et al. |
| 2002/0187398 A1 | 12/2002 | Mikhaylik et al. |
| 2002/0192557 A1 | 12/2002 | Choi et al. |
| 2003/0073000 A1 | 4/2003 | Lee et al. |
| 2003/0082446 A1 | 5/2003 | Chiang et al. |
| 2003/0099884 A1 | 5/2003 | Chiang et al. |
| 2003/0108785 A1 | 6/2003 | Wu et al. |
| 2003/0113622 A1 | 6/2003 | Blasi et al. |
| 2003/0113624 A1 | 6/2003 | Kim et al. |
| 2003/0124416 A1 | 7/2003 | Kaneta |
| 2003/0180611 A1 | 9/2003 | Mikhaylik et al. |
| 2003/0222048 A1 | 12/2003 | Asakawa et al. |
| 2003/0224234 A1 | 12/2003 | Steele et al. |
| 2004/0037771 A1 | 2/2004 | Meissner et al. |
| 2004/0047798 A1 | 3/2004 | Oh et al. |
| 2004/0072066 A1 | 4/2004 | Cho et al. |
| 2004/0118698 A1 | 6/2004 | Lu et al. |
| 2004/0131944 A1 | 7/2004 | Visco et al. |
| 2004/0142244 A1 | 7/2004 | Visco et al. |
| 2004/0175621 A1 | 9/2004 | Iriyama et al. |
| 2004/0191607 A1 | 9/2004 | Nobuta et al. |
| 2004/0197641 A1 | 10/2004 | Visco et al. |
| 2004/0214088 A1 | 10/2004 | Lee et al. |
| 2004/0234851 A1 | 11/2004 | Kim et al. |
| 2005/0042515 A1 | 2/2005 | Hwang et al. |
| 2005/0048371 A1 | 3/2005 | Nagayama et al. |
| 2005/0051763 A1 | 3/2005 | Affinito et al. |
| 2005/0061047 A1 | 3/2005 | Laliberte et al. |
| 2005/0079420 A1 | 4/2005 | Cho et al. |
| 2005/0100793 A1 | 5/2005 | Jonghe et al. |
| 2005/0130041 A1 | 6/2005 | Fensore, III |
| 2005/0131126 A1 | 6/2005 | Yang et al. |
| 2005/0147886 A1 | 7/2005 | Mikhaylik |
| 2005/0156575 A1 | 7/2005 | Mikhaylik |
| 2005/0158535 A1 | 7/2005 | Zhang et al. |
| 2005/0175904 A1 | 8/2005 | Gorkovenko |
| 2005/0186469 A1 | 8/2005 | De Jonghe et al. |
| 2005/0196677 A1 | 9/2005 | Lee et al. |
| 2005/0208353 A1 | 9/2005 | Johnson |
| 2005/0234177 A1 | 10/2005 | Zaghib et al. |
| 2005/0266990 A1 | 12/2005 | Iwasaki et al. |
| 2006/0024579 A1 | 2/2006 | Kolosnitsyn et al. |
| 2006/0051677 A1 | 3/2006 | Matsushima et al. |
| 2006/0057464 A1 | 3/2006 | Kim et al. |
| 2006/0115579 A1 | 6/2006 | Mukherjee et al. |
| 2006/0194096 A1 | 8/2006 | Valle et al. |
| 2006/0222954 A1 | 10/2006 | Skotheim et al. |
| 2006/0234117 A1 | 10/2006 | Fujikawa et al. |
| 2006/0238203 A1 | 10/2006 | Kelley et al. |
| 2006/0246354 A1 | 11/2006 | Lee et al. |
| 2007/0065701 A1 | 3/2007 | Cable et al. |
| 2007/0117007 A1 | 5/2007 | Visco et al. |
| 2007/0172739 A1 | 7/2007 | Visco |
| 2007/0207370 A1 | 9/2007 | Kwak et al. |
| 2007/0212583 A1 | 9/2007 | Johnson |
| 2007/0221265 A1* | 9/2007 | Affinito .............. H01M 4/02 136/243 |
| 2007/0224502 A1 | 9/2007 | Affinito et al. |
| 2007/0289495 A1 | 12/2007 | Cray et al. |
| 2008/0014501 A1 | 1/2008 | Skotheim et al. |
| 2008/0070087 A1 | 3/2008 | Johnson |
| 2008/0100264 A1 | 5/2008 | Kolosnitsyn et al. |
| 2008/0187663 A1 | 8/2008 | Affinito |
| 2008/0213672 A1 | 9/2008 | Skotheim et al. |
| 2008/0246580 A1 | 10/2008 | Braun et al. |
| 2008/0318128 A1 | 12/2008 | Simoneau et al. |
| 2009/0053607 A1 | 2/2009 | Jeong et al. |
| 2009/0077794 A1 | 3/2009 | Hirakawa et al. |
| 2009/0098457 A1 | 4/2009 | Kwon et al. |
| 2009/0159853 A1 | 6/2009 | Sengupta et al. |
| 2009/0200986 A1 | 8/2009 | Kopera et al. |
| 2009/0311604 A1 | 12/2009 | Nazar et al. |
| 2010/0035128 A1* | 2/2010 | Scordilis-Kelley ... H01M 4/581 429/50 |
| 2010/0068623 A1 | 3/2010 | Braun et al. |
| 2010/0104948 A1 | 4/2010 | Skotheim et al. |
| 2010/0129699 A1 | 5/2010 | Mikhaylik et al. |
| 2010/0143823 A1 | 6/2010 | Tanaka et al. |
| 2010/0239914 A1 | 9/2010 | Mikhaylik et al. |
| 2010/0285360 A1 | 11/2010 | Kozinsky et al. |
| 2010/0291442 A1 | 11/2010 | Wang et al. |
| 2011/0008531 A1 | 1/2011 | Mikhaylik et al. |
| 2011/0014524 A1 | 1/2011 | Skotheim et al. |
| 2011/0045346 A1 | 2/2011 | Chiang et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0177398 A1 | 7/2011 | Affinito et al. |
| 2011/0200868 A1 | 8/2011 | Klaassen |
| 2011/0206992 A1 | 8/2011 | Campbell et al. |
| 2011/0256450 A1 | 10/2011 | Campbell et al. |
| 2012/0043940 A1 | 2/2012 | Affinito et al. |
| 2012/0048729 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0276449 A1 | 11/2012 | Skotheim et al. |
| 2013/0017441 A1 | 1/2013 | Affinito et al. |
| 2013/0095380 A1 | 4/2013 | Affinito et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0316072 A1 | 11/2013 | Scordilis-Kelley et al. |
| 2015/0180084 A1 | 6/2015 | Scordilis-Kelley et al. |

FOREIGN PATENT DOCUMENTS

| | | |
|---|---|---|
| CN | 1534811 A | 10/2004 |
| CN | 1574427 | 2/2005 |
| CN | 1874027 A | 12/2006 |
| CN | 101026247 | 8/2007 |
| DE | 199 16 043 A1 | 10/2000 |
| DE | 101 28 970 A1 | 12/2002 |
| EP | 0 700 109 A1 | 3/1996 |
| EP | 1 178 555 A2 | 2/2002 |
| EP | 1 717 879 A1 | 11/2006 |
| EP | 1768202 A | 3/2007 |
| GB | 1011353 A | 11/1965 |
| GB | 1 396 062 A | 5/1975 |

(56) References Cited

FOREIGN PATENT DOCUMENTS

| | | |
|---|---|---|
| JP | 59-130070 A | 7/1984 |
| JP | 63-126156 | 5/1988 |
| JP | 4-028172 | 1/1992 |
| JP | 4-253159 A | 9/1992 |
| JP | 05-325978 A | 12/1993 |
| JP | 6-030246 | 4/1994 |
| JP | H06-124700 A | 5/1994 |
| JP | H07-017197 A | 1/1995 |
| JP | H08-267943 A | 10/1996 |
| JP | 10-55823 A | 2/1997 |
| JP | 09-147868 A | 6/1997 |
| JP | 09-279357 | 10/1997 |
| JP | H10-214638 A | 8/1998 |
| JP | 11-121045 A | 4/1999 |
| JP | H11-114481 A | 4/1999 |
| JP | 11-176423 A | 7/1999 |
| JP | 11-219731 A | 8/1999 |
| JP | 2000-040506 A | 2/2000 |
| JP | 2000-268866 A | 9/2000 |
| JP | 2000-268873 A | 9/2000 |
| JP | 2001-093577 | 4/2001 |
| JP | 2001 143757 | 5/2001 |
| JP | 2002-363898 A | 12/2002 |
| JP | 2003-193110 A | 7/2003 |
| JP | 2003-297431 A | 10/2003 |
| JP | 2003-303588 A | 10/2003 |
| JP | 2004-213902 A | 7/2004 |
| JP | 2004-319489 A | 11/2004 |
| JP | 2005-056701 A | 3/2005 |
| JP | 2005-063848 A | 3/2005 |
| JP | 2005-199190 A | 7/2005 |
| JP | 2005-251429 A | 9/2005 |
| JP | 2005-310836 A | 11/2005 |
| JP | 2005-353452 A | 12/2005 |
| JP | 2006-143478 A | 6/2006 |
| JP | 2006-155900 A | 6/2006 |
| JP | 2006-216565 A | 8/2006 |
| JP | 2006-236685 A | 9/2006 |
| JP | 2006-310033 A | 11/2006 |
| JP | 2006-310281 A | 11/2006 |
| JP | 2006-313737 A | 11/2006 |
| JP | 2006-318892 A | 11/2006 |
| JP | 2007-234338 A | 9/2007 |
| JP | 2007-257850 A | 10/2007 |
| JP | 2009-076260 A | 4/2009 |
| JP | 2009-104902 A | 5/2009 |
| JP | 2010-009856 A | 1/2010 |
| JP | 2010-055755 A | 3/2010 |
| KR | 1020030027395 A | 4/2003 |
| KR | 10-0436712 B1 | 6/2004 |
| KR | 1020040090150 A | 10/2004 |
| KR | 10-0484642 B1 | 4/2005 |
| WO | WO 97/01870 A1 | 1/1997 |
| WO | WO 97/44840 A1 | 11/1997 |
| WO | WO 99/19931 A1 | 4/1999 |
| WO | WO 99/33125 A1 | 7/1999 |
| WO | WO 99/33130 A1 | 7/1999 |
| WO | WO 99/57770 A1 | 11/1999 |
| WO | WO 01/33651 A1 | 5/2001 |
| WO | WO 01/39302 A1 | 5/2001 |
| WO | WO 01/39303 A1 | 5/2001 |
| WO | WO 01/97304 A1 | 12/2001 |
| WO | WO 02/071989 A1 | 9/2002 |
| WO | WO 2005/038953 A1 | 4/2005 |
| WO | WO 2007/028972 A1 | 3/2007 |
| WO | WO 2007/075867 A2 | 7/2007 |
| WO | WO 2007/097172 A1 | 8/2007 |
| WO | WO 2008/153749 A1 | 12/2008 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2009/114314 A2 | 9/2009 |
| WO | WO 2010/062391 A2 | 6/2010 |
| WO | WO 2010/074690 A1 | 7/2010 |
| WO | WO 2012/027457 A2 | 3/2012 |
| WO | WO 2012/174393 A1 | 12/2012 |

OTHER PUBLICATIONS

U.S. Appl. No. 14/576,709, filed Dec. 19, 2014, Scordilis-Kelley et al.
U.S. Appl. No. 12/312,764, filed Feb. 2, 2010, Mikhaylik et al.
U.S. Appl. No. 14/078,648, filed Nov. 13, 2013, Mikhaylik et al.
U.S. Appl. No. 12/535,328, filed Aug. 4, 2009, Scordilis-Kelley et al.
U.S. Appl. No. 12/727,862, filed Mar. 19, 2010, Mikhaylik et al.
U.S. Appl. No. 12/862,528, filed Aug. 24, 2010, Affinito et al.
U.S. Appl. No. 13/644,933, filed Oct. 4, 2012, Affinito et al.
U.S. Appl. No. 13/850,437, filed Mar. 26, 2013, Affinito et al.
Brunauer et al., Adsorption of Gases in Multimolecular Layers. J Am Chem Soc. 1938;60(2):309-19.
Campbell et al., Electrodeposition of Mesoporous Nickel onto Foamed Metals Using Surfactant and Polymer Templates. J Porous Mater. 2004;11(2):63-69.
Cheon et al., Capacity fading mechanisms on cycling a high-capacity secondary sulfur cathode. J Electrochem Soc. Oct. 29, 2004;151(12):A2067-73.
Cheon et al., Rechargeable lithium sulfur battery: II. Rate capability and cycle characteristics. J Electrochem Soc. May 5, 2003;150(6):A800-05.
Cunningham et al., Phase Equilibria in Lithium-Chalcogen Systems. J Electrochem Soc. 1972;119:1448-50.
Doherty et al., Colloidal Crystal Templating to Produce Hierarchically Porous LiFePO4 Electrode Materials for High Power Lithium Ion Batteries. Chem Mater. 2009;21(13):2895-2903.
Garboczi, Permeability, diffusivity, and microstructural parameters: A critical review. Cement and Concrete Res. Jul. 1990;20(4):591-601.
Gireaud et al., Lithium metal stripping/plating mechanism studies: A metallurgical approach. Electrochemistry Communications. 2006;8:1639-49.
Gonzenbach et al., Macroporous ceramics from particle-stabilized wet foams. J Am Ceram Soc. 2007;90(1):16-22.
Hassoun et al., A High-Performance Polymer Tin Sulfur Lithium Ion Battery. Angew. Chem. Int. Ed. 2010, 49, 2371-2374.
Hayashi et al., All-solid-state rechargeable lithium batteries with Li2S as a positive electrode material. Journal of Power Sources 183 (2008) 422-426.
Hirai et al., Influence of electrolyte on lithium cycling efficiency with pressurized electrode stack. J. Electrochem. Soc. 1994;141:611-14.
Ji et al., A highly ordered nanostructured carbon-sulphur cathode for lithium-sulphur batteries. Nature Mater. May 17, 2009;8(6):500-06.
Kim et al., Correlation between positive-electrode morphology and sulfur utilization in lithium-sulfur battery. J Power Sources. May 20, 2004;132(1-2):209-12.
Kulinowski et al., Porous metals from colloidal templates. Adv Mater. 2000;12(11): 833-38.
Lai et al., Synthesis and Electrochemical Performance of Sulfur/Highly Porous Carbon Composites. J. Phys. Chem. C 2009, 113, 4712-4716.
Mikhaylik et al., 380 Wh/kg Rechargeable Li/S Batteries Operating at 90% of Sulfur Utilization. 206$^{th}$ Meeting of The Electrochemical Society. Honolulu, Hawaii. Oct. 3-8, 2004. Abst. 443.
Mikhaylik et al., Polysulfide Shuttle Study in the Li/S Battery System. J Electrochem Soc. 2004;151:A1969-76.
Peer, Tef_methy_ethyl. Accessed online at peer.tamu.edu/curriculum_modules/properties/module_3/Tef_methyl_ethyl.htm. Last accessed May 31, 2013. 1 page.
Probst et al., Structure and electrical properties of carbon black. Carbon. Feb. 2002;40(2):201-5.
Rauh et al., A Lithium/Dissolved Sulfur Battery with an Organic Electrolyte. J Electrochem Soc. 1979;126:523-27.

(56) References Cited

OTHER PUBLICATIONS

Ravikrishna et al., Low-temperature synthesis of porous hydroxyapatite scaffolds using polyaphron templates. J Sol-Gel Sci Techn. Apr. 2006;38(2):203-10.
Ronci et al., A novel approach to in situ diffractometry of intercalation materials: the EDXD technique. Preliminary results on LiNi0.8Co0.2O2. Electrochem Solid-State Lett. 2000;3(4):174-7.
Ruiz-Morales et al., Microstructural optimisation of materials for SOFC applications using PMMA microspheres. J Mater Chem. 2006;16:540-42.
Ryu et al., Discharge behavior of lithium/sulfur cell with TEGDME based electrolyte at low temperature. J Electrochem Soc. 2006;163:201-06.
Sakka et al., Fabrication of porous ceramics with controlled pore size by colloidal processing. Sci Technol Adv Mater. Nov. 2005;6(8):915-20.
Schultz, Lithium: Measurement of Young's modulus and yield strength. Fermilab Technical Memo 2191. Nov. 2002. 5 pages.
Shim et al., The Lithium/Sulfur Rechargeable Cell. Effects of Electrode Composition and Solvent on Cell Performance J Electrochem Soc. 2002;149:A1321-25.
Shin et al., Characterization of N-Methyl-N-B utylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Takeuchi et al., Preparation of electrochemically active lithium sulfide-carbon composites using spark-plasma-sintering process. Journal of Power Sources 195 (2010) 2928-2934.
Wang et al., Electrochemical characteristics of sulfur composite cathode materials in rechargeable lithium batteries. J Power Sources. Nov. 15, 2004;138(1-2):271-73.
Wang et al., Polymer lithium cells with sulfur composites as cathode materials. Electrochimica Acta 48 (2003) 1861-1867.
Wang et al., Sulfur-carbon nano-composite as cathode for rechargeable lithium battery based on gel electrolyte. Electrochem Comm 2002;4(6):499-502.
Woo et al., Preparation and characterization of three demensionally ordered macroporous $Li_4Ti_5O_{12}$ anode for lithium batteries. Electrochimica Acta. 2007;53(1):79-82.
Yuan et al., Improvement of cycle property of sulfur-coated multi-walled carbon nanotubes composite cathode for lithium/sulfur batteries. J Power Sources. Apr. 15, 2009;189(2):1141-46.
Zhang et al., Dual-scale porous electrodes for solid oxide fuel cells from polymer foams. Adv Mater. 2005;17(4):487-91.
Zhang et al., Enhancement of long stability of sulfur cathode by encapsulating sulfur into micropores of carbon spheres. Energy & Environmental Science. 2010, 3, 1531-1537.
Zhang et al., Novel Nanosized Adsorbing Composite Cathode Materials for the Next Generational Lithium Battery. Journal of Wuhan University of Technology—Mater. Sci. Ed. 2007;22(2):234-39.
Zhang et al., Three-dimensional ordered macroporous platinum-based electrode for methanol oxidation. Chinese Sci Bulletin. Jan. 2006;51(1):19-24.
Zheng et al., Electrochemical properties of rechargeable lithium batteries with sulfur-containing composite cathode materials. Electrochem Solid-State Lett., May 12, 2006; 9(7):A364-A367.
Zheng et al., Novel nanosized adsorbing sulfur composite cathode materials for the advanced secondary lithium batteries. Electrochimica Acta. Jan. 5, 2006;51(7):1330-35.
International Search Report and Written Opinion for PCT/US2012/042694 mailed Sep. 6, 2012.
Affinito et al., "A New Class of Ultra-Barrier Materials," 47th Annual Technical Conference Proceedings (2004) ISSN 0737-5921.
Affinito et al., "High Rate Process for Deposition of Plasma Polymerized Films from High Molecular Weight/Low Vapor Pressure Liquid or Solid Monomer Precursor," 2nd International Symposium on Plasma Polymerization/Deposition: Fundamental and Applied Aspects (1999).
Affinito et al., "High rate vacuum deposition of polymer electrolytes," J. Vac. Sci. Technol., A 14(3):733-8 (1996).
Alamgir et al., "Room Temperature Polymer Electrolytes," Lithium Batteries, New Materials, Developments and Perspectives, Chapter 3, pp. 93-136, Elsevier, Amsterdam (1994).
Dominey, "Current State of the Art on Lithium Battery Electrolytes," Lithium Batteries, New Materials, Developments and Perspectives, Chapter 4, pp. 137-165, Elsevier, Amsterdam (1994).
Schultz, Lithium: measurement of Young's modulus. Fermilab Technical Memo 2191. Oct. 2002. 6 pages.
Storck, S. et al., "Characterization of micro- and mesoporous solids by physisorption methods and pore-size analysis", *Applied Catalysis A: General*, 174 (1998) 137-146.
Zhao et al., "A solid-state electrolyte lithium phosphorous oxynitride film prepared by pulsed laster deposition," Thin Solid Films, vol. 415, Issues 1-2, pp. 108-113 (Aug. 1, 2002).
Zhuang et al., "The Reaction of lithium with carbon dioxide studied by photoelectron spectroscopy," Surface Science, 418, pp. 139-149 (1998).
[No Author Listed] Product Data Lists: Lithium metal, battery grade from Chemtall Foote Corporation. 2009. 2 pages.
[No Author Listed] Product Data Lists: Lithium metal, battery grade from LectroMax120 Anode Material for FMC Corporation. 2008. 2 pages.
Anonymous, Low aluminum content lithium alloy for disulfide nonaqueous battery. Research Disclosure Journal. 1994. Research Disclosure No. 364044. 2 pages.
Bae et al., "Study on diffusion and flow of benzene, n-hexane and CC14 in activated carbon by a differential permeation method," Chemical Engineering Science, 57 (2002) 3013-3024.
Bunshah, Ed. Handbook of Deposition Technologies for Films and Coatings. Second Edition. New Jersey: Noyes Publications, 1994. 198-223, 706-719.
Chen et al., Recent advances in lithium-sulfur batteries. J Power Sources. Dec. 1, 2014;267:770-83.
Do et al., "A new diffusion and flow theory for activated carbon from low pressure to capillary condensation range", Chemical Engineering Journal, 84 (2001) 295-308.
Graff et al., "Mechanisms of vapor permeation through multilayer barrier films: Lag time versus equilibrium permeation," Journal of Applied Physics, 2004;96(4):1840-9.
Gregg et al., Adsorption, Surface Area and Porosity, Second Edition, New York: Academic Press, 1982. 2-287.
Kwan et al., "Effect of penetrant size, shape, and chemical nature on its transport through a thermoset adhesive. II. Esters," Polymer, 44 (2003) 3071-3083.
Lordgooei, M et al., "New General Pore Size Distribution Model by Classical Thermodynamics Application: Activated carbon", J. of Environmental Engineering, Apr. 2001, 281-287.
Miyahara et al., "Determination of adsorption equilibria in pores by molecular dynamics in a unit cell with imaginary gas phase," J. Chem. Phys., 106 (19), May 15, 1997, 8124-8134.
Saito et al., "Improvement in Lithium Cycling Efficiency by Using Additives in Lithium Metal," Journal of Power Sources, 1997, vol. 68, pp. 476-479.
Steele et al., "Simulation studies of sorption in model cylindrical micropores," Advances in Colloid and Interface Science, 76-77 (1998) 153-178.
Steele, "The Physical Adsorption of Gases on Solids", Advances in Colloid and Interface Science, 1 (1967) 3-78.

\* cited by examiner

PLATING TECHNIQUE FOR ELECTRODE

RELATED APPLICATIONS

This application claims priority to U.S. Provisional Application No. 61/498,339, filed Jun. 17, 2011, which is incorporated herein by reference in its entirety.

FIELD OF INVENTION

The present invention relates to articles and methods for forming protected electrodes for use in electrochemical cells, including those for use in rechargeable lithium batteries.

BACKGROUND

There has been considerable interest in recent years in developing high energy density batteries with lithium containing anodes. Lithium metal is particularly attractive as the anode of electrochemical cells because of its extremely light weight and high energy density compared to other anodes, such as lithium intercalated carbon anodes, where the presence of non-electroactive materials increases weight and volume of the anode, and thereby reduces the energy density of the cells. Moreover, lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, and fabrication and safety problems have hindered the commercialization of lithium cells. Despite the various approaches proposed for forming lithium anodes and forming interfacial and/or protective layers, improvements are needed.

SUMMARY OF THE INVENTION

Articles and methods for forming protected electrodes in electrochemical cells, including those for use in rechargeable lithium batteries, are provided.

In some embodiments, a series of articles are provided. In one embodiment, an article for use in an electrochemical cell comprises a current collector, and a protective structure. The protective structure is a multi-layered structure comprising a polymer layer and a single-ion conductive layer, wherein each of the layers of the protective structure is non-electroactive and is conductive to ions of an alkali metal. The protective structure is directly adjacent the current collector or is separated from the current collector by one or more intervening layers having a total thickness of less than 2 microns.

In another embodiment, an article comprises a current collector, and a protective structure directly adjacent the current collector or separated from the current collector by one or more intervening layers having a total thickness of less than 2 microns. The protective structure is non-electroactive and is conductive to ions of an alkali metal. The article also includes a cathode and an electrolyte positioned between the protective structure and the cathode. An anisotropic force, having a component normal to a surface of the article, is applied to the article, the component defining a pressure of at least 50 Newtons/cm$^2$.

In another embodiment, an article for use in an electrochemical cell comprises a current collector, and a protective structure. The protective structure is a multi-layered structure comprising a polymer layer and a single-ion conductive layer, wherein each of the layers of the protective structure is non-electroactive and is conductive to ions of an alkali metal. A non-electroactive intervening layer suitable for intercalating an alkali metal ion is positioned between the current collector and the protective structure. Optionally, the article may also include a cathode and an electrolyte positioned between the protective structure and the cathode. Optionally, an anisotropic force, having a component normal to a surface of the article, may be applied to the article, the component defining a pressure of at least 50 Newtons/cm$^2$.

In another set of embodiments, a series of methods are provided. In one embodiment, a method of forming an electrode comprises providing an article comprising a current collector and a protective structure, wherein the protective structure is a multi-layered structure comprising a polymer layer and a single-ion conductive layer. The protective structure is directly adjacent the current collector or is separated from the current collector by one or more intervening layers having a total thickness of less than 2 microns. The method includes providing a source of alkali metal ions, transporting the alkali metal ions from the source across the protective structure, and forming an electroactive layer comprising an alkali metal between the current collector and the protective structure.

In another embodiment, a method of forming an electrode comprises providing an article comprising a current collector and a protective structure, wherein the protective structure is directly adjacent the current collector or is separated from the current collector by one or more intervening layers having a total thickness of less than 2 microns. The method involves providing a source of alkali metal ions, transporting the alkali metal ions from the source across the protective structure, and forming an electroactive layer comprising an alkali metal between the current collector and the protective structure. An anisotropic force, having a component normal to a surface of the article, is applied to the article, the component defining a pressure of at least 50 Newtons/cm$^2$.

In another embodiment, a method of forming an electrode comprises providing an article comprising a current collector and a protective structure, wherein the protective structure is a multi-layered structure comprising a polymer layer and a single-ion conductive layer. The article also includes a non-electroactive intervening layer positioned between the current collector and the protective structure. The method includes providing a source of alkali metal ions, transporting the alkali metal ions from the source across the protective structure, and forming an electroactive layer comprising an alkali metal between the current collector and the protective structure, wherein the electroactive layer comprises at least a portion of the intervening layer The articles and methods described above and herein may be configured, arranged, and/or implemented in a variety of different ways. For example, in some embodiments, the article does not include an alkali metal. In some cases, the article has not been discharged and/or charged (i.e., cycled). E.g., the article has not been cycled more than 2, 4, 6, or 10 times, in some cases. In some instances, the article does not contain byproducts of compounds that would be characteristic of an electrode and/or chemical cell that has been cycled, and/or the article does not contain byproducts of compounds that would be characteristic of an electrode and/or chemical cell that has been cycled more than 2, 4, 6, or 10 times.

The articles and methods described above and herein may include a protective structure that is a multi-layered structure comprising at least two layers of different material composition. The protective structure may be directly adjacent the current collector. The article may further comprises a side or vertical current collector substantially perpendicular to and in contact with each of the layers of the protective structure. In other embodiments, the protective structure is separated from the current collector by one or more intervening layers having a total thickness of less than 2 microns, 1 micron, 500 nm, 200 nm, 100 nm, 50 nm, or 25 nm, or 10 nm. At least one of the one or more intervening layers may have a RMS surface roughness of less than 1 micron, less than 0.5 microns, less than 0.2 microns, less than 0.1 microns, or less than 1 nm. The one or more intervening layers between the current collector and the protective structure may comprise, in some embodiments, a conductive material such as lithium metal or a material containing intercalated lithium compounds may be used as a seed layer for forming an electroactive layer. Other materials comprising an alkali metal may also be used as a seed layer.

In some cases, the articles and methods described above and herein further comprises a cathode, and the one or more intervening layers between the current collector and the protective structure (optionally comprising a lithium-containing material such as lithium metal or intercalated lithium compounds) is present in an amount that is insufficient to participate in a full discharge of the article. In certain embodiments, no such intervening layer is present between the current collector and the protective structure. The article may optionally further comprise a layer of alkali metal positioned adjacent the protective structure on a side opposite the current collector. The article may optionally further comprise a polymer gel layer positioned adjacent the protective structure on a side opposite the current collector. In embodiments including a cathode, the cathode may comprise a source of alkali metal ions, such as a source of lithium ions. In certain embodiments, the cathode comprises a lithium-containing transition metal oxide as an active electrode species; a lithium-containing metal oxide as an active electrode species; a lithium-containing phosphate as an active electrode species; an intercalated lithium compounds as an active electrode species; or sulfur as an active electrode species. In yet other embodiments, the cathode comprises oxygen or water.

In some cases, the articles and methods described above and herein involve an article that is constructed and arranged for applying an anisotropic force, having a component normal to a surface of the article, to the article. The anisotropic force may include a component defining a pressure of at least 50 Newtons/cm$^2$, at least 60 Newtons/cm$^2$, at least 70 Newtons/cm$^2$, at least 80 Newtons/cm$^2$, at least 100 Newtons/cm$^2$, at least 150 Newtons/cm$^2$, or at least 200 Newtons/cm$^2$. In some cases, the anisotropic force includes a component defining a pressure having a magnitude of at least 0.5 times to at least 2 times the yield strength of lithium metal.

In some cases, the articles and methods described above and herein include a source of alkali metal ions in ionic communication with the article. In some embodiments, the source of alkali metal ions comprises an electrolyte bath or a cathode. The article may further comprising an electrolyte.

The articles and methods described above and herein may include a protective structure that comprises at least two single-ion conductive layers and at least two polymer layers, wherein the single-ion conductive layers and the polymer layers are alternating with respect to one another. The single-ion conductive layer may be non-electronically conductive, or electronically conductive. In some cases, the single-ion conductive layer comprises a ceramic conductive to lithium ions, e.g., lithium nitride. In some instances, the single-ion conductive layer comprises a lithium oxide layer positioned on top of a lithium nitride layer (or vice versa). The single-ion conductive layer may comprises pores and at least a portion of the pores are filled with a polymer. The polymer filling at least a portion of the pores of the single-ion conductive layer may be in the form of a polymer layer that is positioned adjacent the single-ion conductive layer. The polymer may, in some cases, comprises an acrylate such as an alkyl acrylate, glycol acrylate, or polyglycol acrylate.

In some embodiments, an article includes a separator positioned adjacent the protective structure on a side opposite the current collector. The article may be part of an electrochemical cell comprising a cathode, and the source of alkali metal ions comprises the cathode. In some cases, the article is part of an electrochemical cell comprising a cathode, and the source of alkali metal ions comprises an electrode different from the cathode. The article may further comprises a layer of alkali metal positioned adjacent the protective structure on a side opposite the current collector, and the source of alkali metal ions comprises the layer of alkali metal. In some cases, the article further comprises a polymer gel layer positioned between the protective structure and the source of alkali metal ions, and a method further comprises transporting the alkali metal ions across the polymer gel layer. A transporting step may comprise charging the article at a rate of between 4 C and C/10. An electrode to be formed by these and other processes may be, for example, a lithium metal anode. In some cases, the article has not been charged prior to the transporting step.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
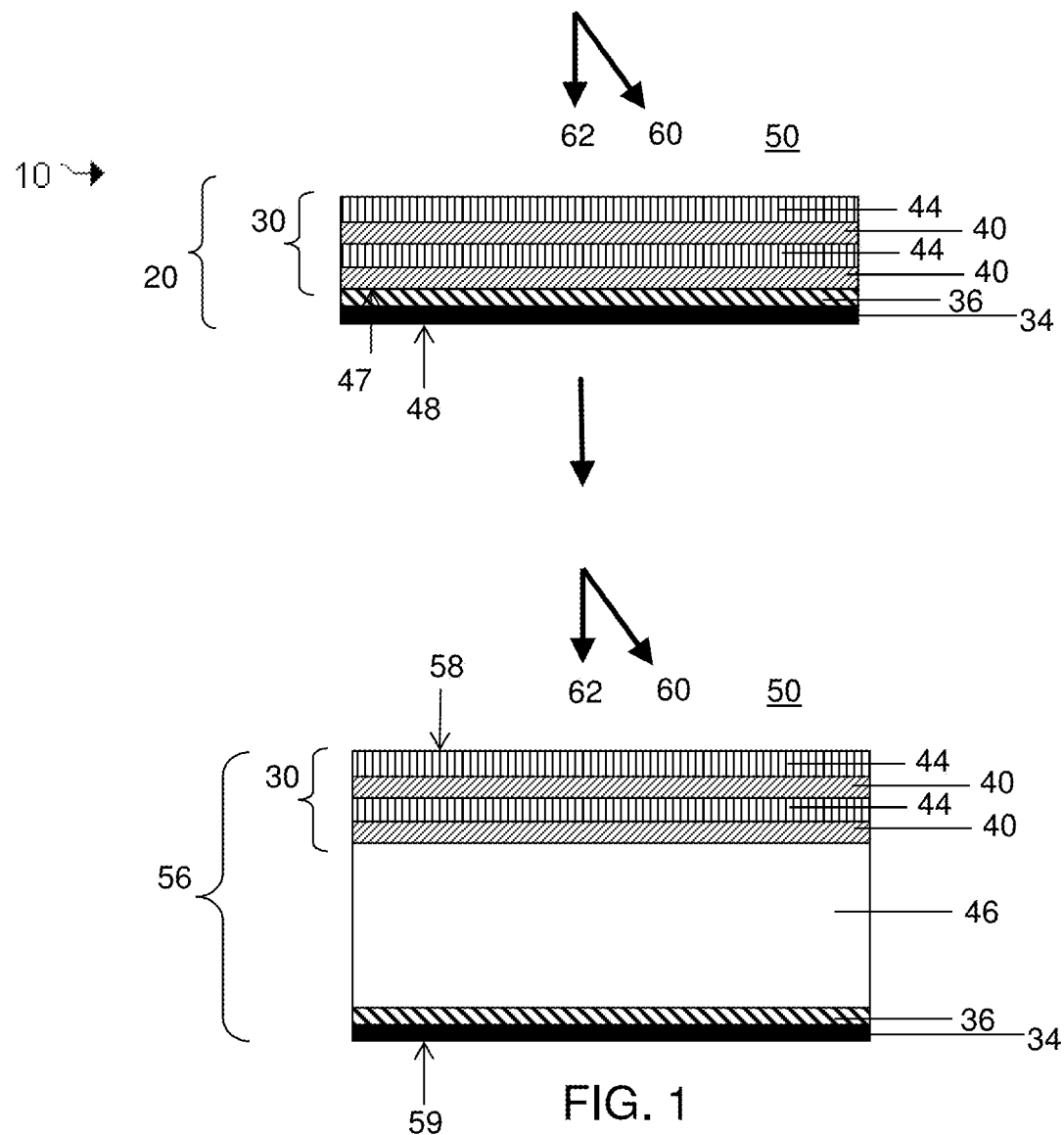
FIG. 1 shows a method of forming an electrode according to one set of embodiments.

Articles and methods for forming protected electrodes for use in electrochemical cells, including those for use in rechargeable lithium batteries, are provided. In some embodiments, the articles and methods involve an electrode that does not include an electroactive layer, but includes a current collector and a protective structure positioned directly adjacent the current collector, or separated from the current collector by one or more thin layers. Lithium ions may be transported across the protective structure to form an electroactive layer between the current collector and the protective structure. In some embodiments, an anisotropic force may be applied to the electrode to facilitate formation of the electroactive layer.

Advantageously, the articles and methods described herein can be used to form electrodes having smooth electroactive layer surfaces and/or smooth protective layer surfaces. Reducing the roughness of one or more of these surfaces may minimize the corrosion rate of the electrode and/or prevent any inactive corrosion reaction products from interfering with charge transport across the electroactive layer surface, as described in more detail below. Moreover, as certain articles and methods described herein involve electrodes and electrochemical cells that do not include an electroactive layer (which may be reactive), the safety of handling of such devices may be improved. In some embodiments, an electroactive layer is present but in relatively small amounts compared to a complete electrochemical cell so as to reduce the amount of reactive material available for potential undesired reactions. Furthermore, formation of an electrode using the methods described herein may result in a protective structure that is less likely to be damaged during use of the electrode (e.g., during the application of an anisotropic force to the electrode). Additional advantages are described in more detail below.

As described herein, in some embodiments, the articles and methods provided can be applied to lithium battery systems, including lithium ion battery systems. Lithium battery systems generally include a cathode which is electrochemically lithiated during the discharge. In this process, lithium metal or an intercalated lithium compound may be converted to lithium ion and transported through the electrolyte to the battery's cathode where it is reduced. In a lithium/sulfur battery, for example, lithium ion forms one of a variety of lithium sulfur compounds at the cathode. Upon charging, the process is reversed, and lithium metal is plated, from lithium ion in the electrolyte, at the anode. In each discharge cycle, a significant amount (e.g., up to 100%) of available Li may be electrochemically dissolved in the electrolyte, and nearly this amount can be re-plated at the anode upon charge. Typically, slightly less lithium is re-plated at the anode at each charge, as compared to the amount removed during each discharge; a small fraction of the metallic Li anode typically is lost to insoluble electrochemically inactive species during each charge-discharge cycle. In a lithium ion battery, the available lithium ions may also be lost upon charge and/or discharge due to various processes.

This process of charging and discharging is stressful to the anode in many ways, and can lead to premature depletion of Li and reduction of the battery cycle life. During this cycling, the Li anode surface can become roughened (which can increase the rate of field-driven corrosion) and Li surface roughening can increase proportionally to the current density. Many of the inactive reaction products associated with overall Li loss from the anode upon cycling can also accumulate on the increasingly roughened Li surface and may interfere with charge transport to the underlying metallic Li electroactive layer. In the absence of other degradation processes in other parts of the battery, the per-cycle Li anode loss alone can eventually render the cell inactive. Accordingly, it is desirable to minimize or inhibit Li-loss reactions, minimize the Li surface roughness/corrosion rate, and prevent any inactive corrosion reaction products from interfering with charge transport across the Li anode surface. Especially at higher current density (which is commercially desirable) these processes can lead to quicker cell death.

As described herein, an electrode or an electrochemical cell may include a protective structure that may be used to prevent or inhibit reaction of an an electroactive layer with other components to be used with the electrode. Examples of such reactive components include electrolytes (e.g., solvents and salts) and cathode discharge products. In some embodiments, the effectiveness of the protective structure in protecting an electroactive layer may depend, at least in part, on the smoothness of the layers of the protective structure and/or the presence of any defects in the structure. In turn, the smoothness of the protective structure may depend, at least in part, on the smoothness of the underlying layer on which the protective structure is deposited. As such, methods described herein may involve selecting or forming a smooth underlying surface (i.e., a surface having a low root mean square (RMS) surface roughness) and then forming a protective structure on top of such a surface.

After a protective structure is formed on top of a smooth underlying surface, the resulting article can be exposed to an electroactive material precursor such as an alkaline metal ion. While applying an appropriate current and/or voltage, the electroactive material precursor may be plated across the protective structure so as to reside between the current collector and the protective structure. Using this method, an electroactive layer having a smooth surface can also be formed. This method contrasts with certain existing methods that may involve first depositing an electroactive layer on top of a current collector, and then forming a protective structure on top of the electroactive layer.

In some existing methods, the formation of an electroactive layer may result in a relatively rougher surface due to the conditions (e.g., temperature, pressure, and formation rate) required to form such a layer. A rough electroactive layer is undesirable since it can increase the surface area available for reaction with components present in the electrolyte, and thereby increase the rate of reaction. Furthermore, as the smoothness of the layers formed on top of the electroactive layer may depend on the smoothness of the underlying layer, the subsequent formation of a protective structure on top of a rough electroactive layer may result in the protective structure having rough surfaces. In some cases, rough surfaces of the protective structure can lead to defects that allow an electrolyte or a component of the electrolyte to pass across it during use of the electrochemical cell, and may result in a reaction between the electrolyte and/or a component of the electrolyte with the electroactive layer. Defects may also be formed in the protective structure since the deposition of the layer(s) of the structure may involve conditions (e.g., temperature, pressure, and formation rate) that are favorable towards the electroactive layer (e.g., a low temperature so as to not cause melting or deformation of the electroactive layer), but less favorable towards the formation of defect-free structures. Such defects can be minimized, in some embodiments, by first forming a protective structure before the electroactive layer, as described herein.

In some embodiments, defects in a protective structure of an electrode that may be formed during use of the electrode may be minimized or mitigated by the use of a protective structure having multiple layers (e.g., multiple layers of single-ion conductive layers and polymer layers), as described in more detail below.

As described herein, in some embodiments an article such as an electrode or electrochemical cell includes a protective structure that may be used to separate an electroactive material from an electrolyte to be used with the electrode or electrochemical cell. The separation of an electroactive layer from the electrolyte of an electrochemical cell can be desirable for a variety of reasons, including (e.g., for lithium batteries) the prevention of dendrite formation during recharging, preventing reaction of lithium with the electrolyte, and increasing cycle life. For example, reaction of an electroactive lithium layer with the electrolyte may result in the formation of resistive film barriers on the anode, which can increase the internal resistance of the battery and lower the amount of current capable of being supplied by the battery at the rated voltage. Many different solutions have been proposed for the protection of lithium anodes in such devices, including coating the lithium anode with interfacial or protective layers formed from polymers, ceramics, or glasses, the important characteristic of such interfacial or protective layers being to conduct lithium ions.

While a variety of techniques and components for protection of lithium and other alkali metal anodes are known, however, these protective coatings present particular challenges, especially in rechargeable batteries. Since lithium batteries function by removal and re-plating (or intercalation) of lithium from a lithium-containing anode in each charge/discharge cycle, lithium ions must be able to pass through any protective coating. The coating must also be able to withstand morphological changes as material is removed and re-plated at the anode.

Many single thin film materials, when deposited on the surface of an electroactive lithium layer, do not have all of the necessary properties of passing Li ions, forcing a substantial amount of the Li surface to participate in current conduction, protecting the metallic Li anode against certain species (e.g., liquid electrolyte and/or polysulfides generated from a sulfur-based cathode) migrating from the cathode, and impeding high current density-induced surface damage. The present inventors have developed solutions to these problems through several embodiments of the invention, including a method of forming an electrode by first forming a protective structure followed by forming the electroactive layer, which can lead to a smoother electroactive layer surface and reduced high current density-induced surface damage; the use of multi-layered protective structures, which can reduce the number of defects in protective structure and/or impart flexibility to the electrode; and/or the use of an applied force during electrode fabrication and/or use.

In many embodiments described herein, lithium rechargeable electrochemical cells (including lithium anodes) are described. For example, the description provided herein may refer to lithium/sulfur batteries or lithium ion batteries. However, wherever lithium electrochemical cells are described herein, it is to be understood that any analogous alkali metal electrochemical cells (including alkali metal anodes) can be used. Additionally, although rechargeable electrochemical cells are primarily disclosed herein, non-rechargeable (primary) electrochemical cells are intended to benefit from the embodiments described herein as well. Furthermore, although the articles and methods described herein are particularly useful in providing anode protection and formation, the articles and methods are also applicable to cathodes.

FIG. 1 shows an example of a method for forming an electrode that includes a protective structure according to one set of embodiments. As shown illustratively in FIG. 1, process 10 involves an article 20 including a protective structure 30 having multiple layers. In this example, the protective structure is formed on top of a current collector 34, with an intervening layer 36 optionally being present between the protective structure and the current collector. The article may be subjected to a source 50 of an electroactive material precursor to form an electroactive layer 46. For instance, a precursor in the form of lithium metal ions may be used to form an electroactive lithium-containing layer such as a lithium metal layer.

As used herein, when a layer is referred to as being "on", "on top of", or "adjacent" another layer, it can be directly on, on top of, or adjacent the layer, or an intervening layer may also be present. A layer that is "directly on", "directly adjacent" or "in contact with" another layer means that no intervening layer is present. Likewise, a layer that is positioned "between" two layers may be directly between the two layers such that no intervening layer is present, or an intervening layer may be present.

In the embodiment illustrated in FIG. 1, the protective structure includes at least two polymer layers 40 and at least two single-ion conductive layers 44, which are arranged in alternating order with respect to each other. Other configurations of the layers of the protective structure are also possible, including a protective structure formed of a single layer. The single layer may be formed of a single type of material, such as a material described herein for a multi-layered structure, or a combination of such materials (e.g., a composite).

In many embodiments described herein, the layer(s) of the protective structure are designed to be non-electroactive, but are conductive to alkali metal ions (e.g., lithium ions). For example, a protective layer may include lithium or lithium salts so as to facilitate conductivity of lithium ions across the layer. However, such a layer is generally non-electroactive meaning it is not used as a source of lithium ions during charge or discharge.

Although FIG. 1 shows alternating polymer layers and single-ion conductive layers, the one or more layers of the protective structure can be made of any suitable materials including ceramic, glass, glassy-ceramics, metals, and/or polymers that may be conductive to Li ions. In some embodiments, the one or more layers may substantially impede the passage of electrons across the layer(s), while in other embodiments, the one or more layers may be electronically conductive. By "substantially impedes", in this context, it is meant that in this embodiment the material allows lithium ion flux at least ten times greater than electron passage. In certain embodiments, the layers of the protective structure are deposited on current collector 34 or intervening layer 36 that is very smooth and continuous (e.g., without having substantial protrusions and/or indentations on its surface). As such, the formation of the layers of the protective structure may also be smooth.

In some embodiments, article 20 does not include an electroactive layer so it may be handled, transported, or stored in a safer manner than that which is typically required for an electrode including a reactive electroactive material such as lithium. Furthermore, the step of forming the protective structure on the current collector may be decoupled from the step of forming the electroactive layer. In some cases, article 20 may be formed by a first entity, and the step of forming the electro active layer may be performed by a second entity. For example, article 20, made by a manufacturer, may be sold to an end user who can then form the electroactive layer by charging the article prior to use. In other embodiments, the step of forming the electroactive layer may be carried out at a later time (e.g., at least 1 day, 1 week, 1 month, or 1 year later) after article 20 is formed.

Additionally, in some embodiments involving the formation of a protective structure on top of a layer that does not include an alkali metal (e.g., lithium metal), conditions suitable for forming layers having a reduced number of defects may be possible. When a protective structure is formed on top of an electroactive lithium layer using certain existing methods, it is typically deposited using certain techniques and under suitable temperatures, pressures and/or rates so as to not negatively affect the lithium layer. For instance, lithium metal has a relatively low melting point so layers formed on top of the lithium metal are typically deposited at temperatures below the melting point of lithium. These conditions may result in the formation of protective layers that have defects depending on the particular technique and materials used to form the protective layers. When an electroactive layer is not present, however, the deposition of one or more layers of the protective structure may be carried out at higher temperatures (and/or higher or lower pressures), which may result in layers having fewer numbers of defects. Thus, the methods described herein may allow a larger range of conditions and a greater variety of techniques to be used for forming a protective structure.

As described above, FIG. 1 shows an intervening layer 36 that may optionally be present between the protective structure and the current collector. The intervening layer may be in the form of one or more thin layers that may facilitate the deposition of a smooth layer of a protective structure on top of it. Additionally or alternatively, the intervening layer may facilitate the formation of a smooth electroactive layer. For instance, the intervening layer may be used to cause even plating of the electroactive layer, e.g., by lowering the energy of plating and/or preventing or minimizing the formation of protrusions or indentations on the layer. The intervening layer may include, for example, a metal or a semiconductor, but other materials can also be used.

In some cases, at least a portion of the intervening layer may integrate with the electroactive layer during formation of the electroactive layer. For example, an intervening layer comprising a metal Z may result in the formation of a lithium-Z alloy during formation and/or use of the electrode. In some embodiments, the intervening layer may be formed of or comprise an electroactive material, such as an alkali metal (e.g., lithium metal), and may act as a seed layer for forming an electroactive layer of the same material. In such embodiments, the alkali metal intervening layer may be present in an amount such that the alkali metal participates in less than a full discharge of an electrochemical cell that includes such a layer. In certain embodiments, the intervening layer does not comprise an alkali metal. In embodiments in which an intervening layer comprises an electroactive material, the electroactive material may be present but in relatively small amounts compared to a complete electrochemical cell so as to reduce the amount of reactive material available for potential undesired reactions. Examples of materials that may be suitable for an intervening layer are described in more detail below.

In some embodiments, the one or more intervening layers, if present, may be thin such that the distance between the protective layer and the current collector is small. The distance between the surface of the protective layer closest to the current collector (e.g., surface 47) and the surface of the current collector closest to the protective structure (e.g., surface 48) may vary from, for example, between 1 nm and 2 microns. For instance, distance may be less than or equal to 2 microns, less than or equal to 1.5 microns, less than or equal to 1 micron, less than or equal to 800 nm, less than or equal to 600 nm, less than or equal to 400 nm, less than or equal to 300 nm, less than or equal to 200 nm, less than or equal to 100 nm, less than or equal to 50 nm, less than or equal to 40 nm, less than or equal to 30 nm, less than or equal to 20 nm, less than or equal to 10 nm, or less than or equal to 5 nm. In some embodiments, the distance may be greater than or equal to 5 nm, greater than or equal to 10 nm, greater than or equal to 20 nm, greater than or equal to 30 nm, greater than or equal to 40 nm, greater than or equal to 50 nm, greater than or equal to 100 nm, greater than or equal to 200 nm, greater than or equal to 300 nm, greater than or equal to 400 nm, greater than or equal to 600 nm, greater than or equal to 800 nm, greater than or equal to 1 micron, or greater than or equal to 1.5 microns. Other ranges of distances are also possible. Combinations of the above-referenced ranges are also possible (e.g., a distance of less than 2 microns but greater than or equal to 10 nm).

In other embodiments, the one or more intervening layers, if present, may be relatively large (e.g., such that the distance between the protective layer and the current collector is relatively larger than the ranges recited above), but the amount of an electroactive material (if any) present in the layer between the current collector and the protective layer may be relatively small compared to a complete electrochemical cell. For instance, the intervening layer may be a carbon-containing layer for a lithium-ion battery, but the amount of alkali metal species (e.g., lithium) in the intervening layer (if any) may be present in an amount such that the alkali metal participates in less than a full discharge of an electrochemical cell that includes such a layer. In some cases, the amount of alkali metal present in the intervening layer may be less than 1.0 times, less than 0.8 times, less than 0.6 times, less than 0.4 times, less than 0.2 times, or less than 0.1 times that necessary for a full discharge in an electrochemical cell that includes such a layer. In some such embodiments, the thickness of the intervening layer may vary from, for example, between 1 nm and 50 microns, as described in more detail below. In some cases, at least a portion of the intervening layer may be used to form an electroactive layer; that is, the electroactive layer formed after charge may comprise at least a portion of the intervening layer.

As described herein, the methods and articles provided herein may allow the formation of smooth surfaces. In some embodiments, the RMS surface roughness of an electroactive layer, a layer of the protective structure (e.g., a single-ion conductive layer and/or a polymer layer), an intervening layer, and/or a current collector may be, for example, less than 1 µm. In certain embodiments, the RMS surface roughness for such surfaces may be, for example, between 0.5 nm and 1 µm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 µm, less than or equal to 0.8 µm, less than or equal to 0.7 µm, less than or equal to 0.6 µm, less than or equal to 0.5 µm, less than or equal to 0.4 µm, less than or equal to 0.3 µm, less than or equal to 0.2 µm, less than or equal to 0.1 µm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Other values are also possible. Combinations of the above-noted ranges are also possible (e.g., a RMS surface roughness of less than or equal to 0.5 µm and greater than 10 nm). In some embodiments, any intervening layer having a thickness of less than 2 microns positioned between a protective structure and a current collector has a RMS surface roughness of, for example, less than 1 µm. The intervening layer may have a RMS surface roughness of one or more of the ranges noted above.

As shown illustratively in FIG. 1, source 50 of electroactive material precursor may be positioned on a side of the protective structure opposite the current collector. The source of electroactive material precursor may be in solution form (e.g., as part of an electrolyte solution), solid form (e.g., as part of a layer of electroactive material, or as part of a cathode), or in the form of a gel. Additional examples are described in more detail below. A current and/or a voltage can be applied between current collector 34 and source 50 to cause ions of the electroactive material precursor to be transported across protective structure 30 to form electroactive layer 46. For instance, a negative potential may be applied to current collector 34, and a positive potential may be applied to a cathode on the opposite side of the protective structure. Accordingly, electrode 56 including an electroactive layer may be formed by such a process.

During formation of the electroactive layer, the source of electroactive material precursor may be present in any suitable position with respect to components of the electrode (e.g., article 20 of FIG. 1). In some embodiments, the source is packaged together with the electrode in the form of an electrochemical cell. For example, as shown illustratively in FIG. 2, article 100, an electrochemical cell may include protective structure 30 adjacent current collector 34, optionally with an intervening layer (not shown) positioned between the protective structure and the current collector. The article may further include an electrolyte 140, a cathode 150, and a current collector adjacent the cathode (not shown). The article may also include a containment structure 156 to house the components of the electrochemical cell. As shown illustratively in FIG. 2, source 50 of electroactive material precursor may be present as part of the cathode or the electrolyte, although other configurations are also possible.

During an initial charge, the electroactive material precursor may be transported across the protective structure to form electroactive layer 46 as part of electrochemical cell 102. The electroactive layer may be formed between the protective structure and the current collector. As described herein, in some embodiments an intervening layer is present between the current collector and the protective structure, but the intervening layer is not electroactive or is minimally electroactive in the sense that there is insufficient electroactive species present in the layer to participate in a full discharge (or less than 0.8 times, less than 0.6 times, less than 0.4 times, less than 0.2 times, or less than 0.1 times a full discharge) in an electrochemical cell that includes such a layer. In such embodiments, during an initial charge, the electroactive material precursor may be transported across the protective structure to form electroactive layer 46 as part of electrochemical cell. For instance, alkali metal ions may be transported across the protective structure and may intercalate into layer 46 to form an electroactive layer. As such, the intervening layer may comprise a material suitable for intercalating an alkali metal ion. In some cases, a method includes forming an electroactive layer comprising an alkali metal, wherein the electroactive layer comprises at least a portion of the intervening layer.

In some cases, electroactive material precursor 50 is integrated with a cathode such that during an initial charge, the precursor is transported across both an electrolyte and the protective structure to form the electroactive layer. The electroactive material precursor may be in the form of a lithium ion-containing material, such as materials suitable for use as lithium ion cathodes. Non-limiting examples of such materials include nickel-cobalt manganese lithium-ion (e.g., $LiNi_xMn_yCozO_2$), spinel-based lithium-ion (e.g., $LiMn2O_4$), and cobalt-based lithium-ion (e.g., $LiCoO_2$) materials. Other materials that can be used for lithium ion cathodes are known in the art and can be used as precursors for forming an electroactive layer. Other alkaline-metal cathode materials other than lithium-based materials can also be used.

The amount of electroactive material precursor can be calculated based, at least in part, on the desired amount and thickness of the electroactive layer to be formed, and/or any electroactive material precursor that may be lost during initial charge (e.g., by irreversible reactions), by those of ordinary skill in the art.

In other embodiments, the electroactive material precursor may be in the form of a lithium metal layer present on a side of the protective structure opposite that of the current collector. For example, a lithium layer may be present between the cathode and the electrolyte (e.g., a solid or gel electrolyte), between the electrolyte and the protective structure, between the cathode and a separator (not shown), between a separator and the protective structure, or at any other suitable position. In some cases, such a configuration of components of an electrochemical cell may involve an electrolyte that is minimally reactive with the lithium metal layer. In other embodiments, the electroactive material precursor may be in the form of a lithium metal layer sandwiched between two protective structures (e.g., a first and a second protective structure) such that the lithium metal layer is not in direct contact with an electrolyte. During charge, the lithium metal layer may pass through a first protective structure and may form an electroactive layer positioned between the current collector and the first protective structure. In some cases, the first protective structure can then be directly adjacent the second protective structure that was originally sandwiching the electroactive material precursor. Other configurations are also possible.

In certain embodiments, article 100 includes a polymer gel layer adjacent a surface 132 of the protective structure and/or on a side of the protective structure opposite the current collector. During formation of the electroactive layer, the electroactive material precursor may be transported past both the polymer gel layer and the protective structure. In other embodiments, the source of electroactive material precursor may be present in the polymer gel layer.

In other embodiments, the source of electroactive material precursor is not part of the electrochemical cell, but instead is contained in another suitable structure for forming an electroactive layer. For instance, the electroactive material precursor may be in the form of a cathode or an electrolyte that is separate from the article forming the protective structure and current collector. The electroactive material precursor may be, for example, an electrolyte bath that contains the necessary components for forming an electroactive layer. The electroactive layer may be formed by immersing the electrode in the electrolyte bath which contains a cathode, and applying an appropriate current and/or voltage to cause transport of ions across the protective layer of the electrode precursor. After the electrode is formed, it may be assembled with other components to form an electrochemical cell.

In some embodiments, the source of electroactive material precursor is in the form of an electrode (e.g., a cathode), and the cathode is different from the cathode to be used with the anode formed using the electroactive material precursor. For instance, referring to FIG. 2, the source of alkaline metal ions for forming an alkaline metal electrode may be in the form of a third electrode that is inserted into electrolyte 140 of article 100 during plating of an alkaline metal layer between the protective structure and the current collector. After the alkaline metal ions are transported across the protective structure to form the electroactive layer, any remaining source of electroactive material precursor may be removed from the electrolyte. The remaining component present in article 100 may then be packaged to form a closed electrochemical cell.

It should be appreciated that other configurations involving a source of electroactive material precursor are possible and that the figures and description provided herein are non-limiting.

Those of ordinary skill in the art can choose appropriate voltages and/or currents for transporting a electroactive material precursor (e.g., alkali metal ions) across the protective structure, and optionally across other components such as a polymer gel layer, electrolyte, etc. The voltages and/or currents may be chosen based on a variety of factors such as the material compositions of the electroactive material precursor, layer(s) of the protective structure, and any intervening layers; the thicknesses of such layers; the ion conductivity through such layers; the form of the electroactive material precursor (e.g., whether the material is in the form of a solid, liquid or gel); amongst others.

In some embodiments, a voltage and/or a current can be applied during the initial charge to form the electroactive layer and the magnitude of the voltage and/or current may vary over the duration of the charge. In one set of embodiments, a low or moderate current may be applied initially for a certain period of time to facilitate formation of a uniform and smooth electroactive (e.g., lithium metal) layer. For example, a relatively low or moderate current may be applied during at least 5% of the total initial charge (e.g., during at least 10%, 20%, 30%, 40%, 50%, 60%, 70%, 80%, or 90% of the total initial charge, the % of the total initial charge meaning the percentage of the total amount of electroactive material deposited at the electrode). In some embodiments, such a current may be applied during 5% to 90% of the total initial charge. Charging may be continued by applying a taper charge; that is, applying a voltage that allows the current to decay to a predetermined value (e.g., less than 20%, less than 15%, less than 10%, less than 5%, less than 2%, less than 1%, or less than 0.5% of the initial current). Another method of charging the electrode to form the electroactive layer may involve the use of variable rates (e.g. starting with a low rate and then ramping or stepping up to higher rates). In other embodiments, pulse charges can be used (milliseconds of charge followed by milliseconds of rest). A specialized version of a pulse charge may include utilizing brief (<10 times the charge pulse width) discharges after each charge pulse to enhance metal-ion (e.g., Li ion) transport. In some cases, a combination of such methods of charging can be used. Other methods of charging can also be used.

The current used during the initial charge may range, for example, between 1 $\mu A/cm^2$ and 1 $A/cm^2$ (e.g., between 1 $\mu A/cm^2$ and 10 $\mu A/cm^2$, between 10 $\mu A/cm^2$ and 100 $\mu A/cm^2$, between 100 $\mu A/cm^2$ and 1 $mA/cm^2$, between 1 $mA/cm^2$, and 100 $mA/cm^2$, or between 100 $mA/cm^2$ and 1 $A/cm^2$). In some cases, the applied current during at least 20%, at least 40%, at least 60%, or at least 80% of the initial charge is at least 10 $\mu A/cm^2$, at least 100 $\mu A/cm^2$, at least 1 $mA/cm^2$, at least 10 $mA/cm^2$, or at least 100 $mA/cm^2$. For instance, higher currents may be useful when applying variable charging rates. In some embodiments, the applied current during at least 20%, at least 40%, at least 60%, or at least 80% of the initial charge is less than 1 $A/cm^2$, less than 100 $mA/cm^2$, less than 10 $mA/cm^2$, less than 1 $mA/cm^2$, less than 100 $\mu A/cm^2$, or less than 10 $\mu A/cm^2$. Other ranges are also possible. Combinations of the above-noted ranges are also possible.

The applied voltage may vary from, for example, between −1 V versus Li°/Li+ and −100 mV (e.g., between −1 V versus Li°/Li+ and −500 mV, between −500 mV and −300 mV, between −300 mV and −100 mV, or between −250 mV and −100 mV). Other ranges are also possible. The applied voltage (as well as the applied current) may depend on factors such as the polarization, the primary resistance of the layers through which the ions are transported, as well as the electrolyte conductivity and cell design.

In some embodiments, an "initial charge" as described herein may be a charge during a process of forming an electrode or electrochemical cell, e.g., formation charging. Such a formation process is typically performed by a manufacturer of the electrode or electrochemical cell. Formation may also involve testing of other features of the electrode or electrochemical cell, such as aging control, charge/discharge, and OCV/ACR/DCR testing, e.g., using one or more battery formation systems. In other embodiments, an "initial charge" as described herein may refer to an initial charge by an end user of the electrode or electrochemical cell.

The transport of ions through a protective structure (and optionally other components) may involve charging an article at a particular rate to form an electroactive layer between the protective structure and a current collector. In some embodiments, charging may be performed at a rate of, for example, between 10 C and C/120 (where 1 C means the cell is charged in one hour and 4 C means the cell is charged in ¼ of an hour or 15 minutes). In certain embodiments, charging is performed at a rate of between 8 C and C/60, between 4 C and C/60, between 4 C and C/30, or between 2 C and C/15. In certain embodiments, the article is charged at a rate of at least C/120, at least C/90, at least C/60, at least C/50, at least C/40, at least C/30, at least C/20, at least C/10, at least C, at least 2 C, at least 3 C, at least 4 C, at least 5 C, at least 6 C, at least 7 C, at least 8 C, or at least 9 C. In some embodiments, the article is charged at a rate of less than 9 C, less than 8 C, less than 7 C, less than 6 C, less than 5 C, less than 4 C, less than 3 C, less than 2 C, less than C, less than C/10, less than C/20, less than C/30, less than C/40, less than C/50, less than C/60, less than C/90, or less than C/120. Other ranges are also possible. Combinations of the above-noted ranges are also possible (e.g., a rate of at least 4 C and less than C/60).

Figure 2:
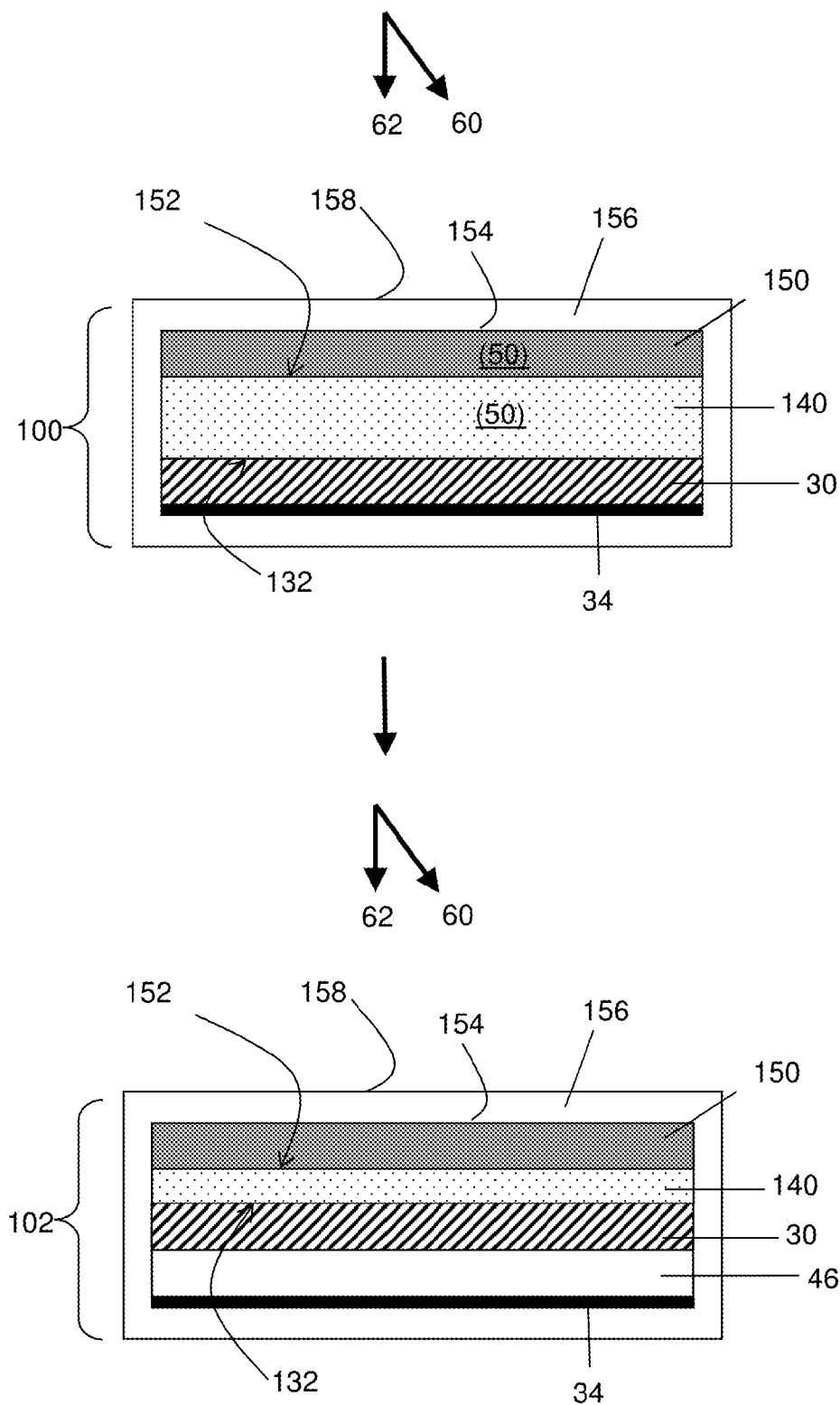
FIG. 2 shows a method of forming an electrochemical cell according to one set of embodiments.

As shown illustratively in FIG. 2, article 100 does not include an electroactive layer. As such, the article may have improved safety features that allow it to be handled, transported, and/or stored with ease. The advantages described above with respect to article 20 of FIG. 1 also apply to article 100 of FIG. 2.

As shown illustratively in FIGS. 1 and 2, in some embodiments, an anisotropic force having a component normal to the surface of the article is applied to the article during formation and/or use of the article, as described in more detail below. For example, a force may be applied in the direction of arrow 60, wherein arrow 62 illustrates the component of the force that is normal to a surface 47 or 48 of article 20 of in FIG. 1, surface 58 or 59 of article 56 of FIG. 1, or surface 132 or 152 of the articles shown in FIG. 2.

As described herein, the inventive articles and methods may involve electrodes or electrochemical cells that include components for protecting an electroactive layer, but do not include the electroactive layer itself. Such articles may include, for example, a current collector and a protective structure positioned directly adjacent the current collector, or separated from the current collector by one or more thin layers, or other intervening layer as described herein. In some embodiments, such articles may be described as "having not gone through a discharge", "undischarged", ones that "have not been discharged", or ones that "have not been used in a discharge process", meaning that no substantial amount of ions has been released from a reservoir positioned between the current collector and the protective structure and transported across the protective structure to a side opposite that of the current collector (e.g., in a manner that produces useful energy). Thus, the articles that are characterized in this manner are not meant to include electrodes and electrochemical cells that have been cycled through and/or discharged by an end user.

In certain embodiments in which the electrodes and electrochemical cells described herein include an initial source of ions positioned between the current collector and the protective structure, at least 10 wt %, 20 wt %, 40 wt %, 60 wt %, 80 wt %, 90 wt %, 95 wt %, 98%, or 99% of the source has not been released in the form of ions and transported across the protective structure to a side opposite that of the current collector. In other words, at least 10 wt %, 20 wt %, 40 wt %, 60 wt %, 80 wt %, 90 wt %, 95 wt %, 98%, or 99% of the source initially present in the article remains positioned between the current collector and the protective structure. In some cases, an amount of the source of ions in a range noted above is present in the electrode or electrochemical cell at the time, or just prior to, the formation of an electroactive layer between the current collector and the protective structure in the electrode or electrochemical cell, the assembly of the electrode into an electrochemical cell, or the use of the electrode or electrochemical cell by an end user.

In certain embodiments, the articles provided herein may be described as "having not gone through a charge/discharge cycle", "uncycled", or ones that "have not been cycled", meaning that no substantial amount of ions has been released from a reservoir positioned between the current collector and the protective structure and transported across the protective structure to a side opposite that of the current collector, and no substantial amount of ions has been transported across the protective structure from a side opposite that of the current collector to a reservoir positioned between the current collector and the protective structure (in either order).

In certain embodiments, the articles provided herein have not been subjected to an electrochemical process of removing an alkali metal from the article, e.g., removing an alkali metal from a source positioned between a current collector and a protective structure, such as by transporting ions of the alkali metal across the protective structure to a side opposite that of the current collector.

In some embodiments, the articles provided herein have not been charged and/or discharged (i.e., cycled, fully or partially) more than 30 times, 20 times, 15 times, 10 times, 8 times, 6 times, 5 times, 4 times, 3 times, 2 times, or 1 time. The articles described herein may be characterized by having gone through no full charges and/or no full discharges in some embodiments. In some cases, an electrode or an electrochemical cell may be characterized by having gone through no charges and/or discharges (partially or fully). In other embodiments, an electrode or an electrochemical cell may be partially charged (and, optionally, fully charged at a later time), but not discharged. In yet other embodiments, an electrode or an electrochemical cell may be partially charged and/or discharged. Upon fully charging an electrode or an electrochemical cell, an electroactive layer may be formed between a current collector and a protective structure, as described herein.

In some embodiments, the articles provided herein (e.g., electrodes and electrochemical cell), or certain components of the articles provided herein (e.g., an intervening layer), do not contain residual materials that would be characteristic of an electrode and/or a cell that has been cycled or spent, or byproducts of compounds that would be characteristic of an electrode and/or cell that has been cycled or spent. In some cases, the articles provided herein do not contain residual materials that would be characteristic of an electrode and/or a cell that has been cycled more than 30 times, 20 times, 15 times, 10 times, 8 times, 6 times, 5 times, 4 times, 3 times, 2 times, or 1 time, or byproducts of compounds that would be characteristic of an electrode and/or cell that has been cycled more than 30 times, 20 times, 15 times, 10 times, 8 times, 6 times, 5 times, 4 times, 3 times, 2 times, or 1 time.

The articles provided herein which do not include an electroactive layer may, in some embodiments, be described as "an electrode precursor" or "an electrochemical cell precursor". The articles may be "precursors" in the sense that they are structures used to form an electrode or electrochemical cell that include an electroactive layer (e.g., one that is positioned at an electrode between a current collector and a protective structure).

In one set of embodiments, an article described herein which may be used as a precursor to an electrode including an electroactive layer includes a protective structure in the form of a multi-layered structure. Multi-layered structures can allow passage of lithium ions (or other alkali metal ions) and may impede the passage of other components that may otherwise damage the anode. Advantageously, multi-layered structures can reduce the number of defects and thereby force a substantial amount of the Li surface to participate in current conduction, impede high current density-induced surface damage, and/or act as an effective barrier to protect the anode from certain species (e.g., electrolyte and/or polysulfides.

In some embodiments, the multi-layered structure includes at least two layers having different chemical compositions. The multi-layered structure may include, for example, at least a first single-ion conductive material layer (e.g., a lithium-containing ceramic or metal layer), and at least a first polymeric layer positioned adjacent the single-ion conductive layer. In this embodiment, the multi-layered structure may optionally include several sets of alternating single-ion conductive material layers and polymeric layers. The polymer layer or the single-ion conductive layer may be positioned adjacent a current collector (or separated from the current collector by one or more thin intervening layers as described herein). The multi-layered structures can allow passage of lithium ions, while limiting passage of certain chemical species that may adversely affect the electroactive layer when it is present. This arrangement can provide significant advantage, as polymers can be selected that impart flexibility to the system where it can be needed most, namely, at the surface of the electroactive layer where morphological changes occur upon charge and discharge.

A multi-layered structure can include various numbers of polymer/single-ion conductive pairs as needed. Generally, a multi-layered structure can have n polymer/single-ion conductive pairs, where n can be determined based on a particular performance criteria for a cell. E.g., n can be an integer equal to or greater than 1, or equal to or greater than 2, 3, 4, 5, 6, 7, 10, 15, 20, 40, 60, 80, or 100. In some embodiments, a multi-layered structure can include between 1 and 100 polymer/single-ion conductive pairs (e.g., between 1 and 5, between 1 and 10, between 5 and 10, between 5 and 50, between 5 and 100, or between 4 and 20 polymer/single-ion conductive pairs). In some cases, a multi-layered structure may include greater than or equal to 4, greater than or equal to 6, greater than or equal to 8, greater than or equal to 10, greater than or equal to 12, greater than or equal to 14, greater than or equal to 16, greater than or equal to 18, or greater than or equal to 20 polymer/single-ion conductive pairs. In other embodiments, less than 20, less than 18, less than 16, less than 14, less than 12, less than 10, less than 8, less than 6, less than 4, or less than 2 polymer/single-ion conductive pairs may be present. Other ranges are also possible. Combinations of the above-noted ranges are also possible.

In other embodiments, a multi-layered structure may include a greater number of polymer layers than single-ion conductive layers, or a greater number of single-ion conductive layers than polymer layers. For example, a multi-layered structure may include a n polymer layers and n+1 single-ion conductive layers, or n single-ion conductive layers and n+1 polymer layers, where n is greater than or equal to 2. E.g., n may equal 2, 3, 4, 5, 6, or 7, etc. In some cases, in at least 50%, 70%, 90%, or 95% of the ion-conductive layers, such layers are immediately adjacent a polymer layer on either side.

It should be appreciated that in other embodiments, a protective structure and/or multi-layered structure need not include alternating polymer and single-ion conductive layers, and that other materials and configurations (such as non-alternating layers) can be used.

As mentioned, multi-layered electrode stabilization structures can provide significant advantages where a particular amount of materials defining the structure are arranged in thinner, and greater numbers of them are formed. In some embodiments, each layer of the multi-layered structure has a maximum thickness of less than or equal to 100 microns, less than or equal to 50 microns, less than or equal to 25 microns, less than or equal to 10 microns, less than or equal to 1 micron, less than or equal to 500 nanometers, less than or equal to 200 nanometers, less than or equal to 150 nanometers, less than or equal to 125 nanometers, less than or equal to 100 nanometers, less than or equal to 75 nanometers, less than or equal to 50 nanometers, less than or equal to 25 nanometers, less than or equal to 10 nanometers, or less than or equal to 1 nanometer. Sometimes, the thickness of a single type of layer may be the same in a multi-layered structure. For instance, polymer layers 40 and 44 of FIG. 1 may have the same thickness in the protective structure. In other embodiments, the thickness of a single type of layer may be different in a multi-layered structure, e.g., polymer layers 40 may have different thicknesses in multi-layered structure. The thicknesses of different types of layers in a multi-layered structure may be the same in some cases, or different in other cases. For example, the thicknesses of the polymer layers 40 may be different than the thickness of the single-ion conductive layers. Those of ordinary skill in the art can select appropriate materials and thicknesses of layers in combination with the description herein.

A protective structure (e.g., a multi-layered structure) may have various overall thicknesses that can depend on, for example, the electrolyte, the cathode, or the particular use of the electrode or electrochemical cell. In some cases, a protective structure (e.g., a multi-layered structure) can have an overall thickness of, for example, between 50 nm and 100 microns (e.g., between 50 nm and 100 nm, between 50 nm and 200 nm, between 50 nm and 500 nm, between 50 nm and 1 micron, between 50 nm and 2 microns, between 50 nm and 5 microns, between 50 nm and 10 microns, between 1 micron and 5 microns, between 2 microns and 10 microns, between 500 nm and 2 microns, between 500 nm and 5 microns, or between 10 microns and 100 microns).

In some cases, a protective structure (e.g., a multi-layered structure) may have an overall thickness of, for example, less than or equal to 100 microns, less than or equal to 75 microns, less than or equal to 50 microns, less than or equal to 25 microns, less than or equal to 10 microns, less than or equal to 5 microns, less than or equal to 3 microns, less than or equal to 2 microns, less than or equal to 1.75 microns, less than or equal to 1.5 microns, less than or equal to 1.25 microns, less than or equal to 1 micron, less than or equal to 700 nm, less than or equal to 500 nm, less than or equal to 250 nm, less than or equal to 100 nm, less than or equal to 75 nm, or less than or equal to 50 nm.

In some cases, a protective structure (e.g., a multi-layered structure) can have an overall thickness of, for example, greater than or equal to 50 nm, greater than or equal to 75 nm, greater than or equal to 100 nm, greater than or equal to 250 nm, greater than or equal to 500 nm, greater than or equal to 700 nm, greater than or equal to 1 micron, greater than or equal to 1.5 microns, greater than or equal to 2 microns, greater than or equal to 5 microns, greater than or equal to 10 microns, greater than or equal to 25 microns, greater than or equal to 75 microns, or greater than or equal to 100 microns. Other values of thicknesses are also possible. Combinations of the above-referenced ranges are also possible (e.g., a protective structure having an overall thickness of greater than 50 nm and less than 2 microns).

It may also be desirable, in some embodiments, to have a multi-layered structure having a certain thickness with a certain number of polymer/single-ion conductive material pairs. For instance, in one embodiment, a multi-layered structure may have a thickness in one or more of the above-referenced ranges and may include greater than 5, 10, 20, 30, 40, 50, or 100 polymer/single-ion conductive material pairs. It is to be understood that a variety of embodiments are provided by the invention, each including specific combinations of overall protective structure thickness, thicknesses of individual layers, numbers of individual layers, etc. as described herein.

As noted in the description herein, in one set of embodiments, the protective structure includes a polymer layer adjacent the current collector (or thin intermediate layer(s)). In other arrangements, a polymer layer need not be the first layer adjacent the current collector or thin intermediate layer(s). Various arrangements of the protective structure, including various multi-layered structures, are described herein in which the first layer adjacent the current collector or thin intermediate layer(s) may or may not be polymeric. It is to be understood that in all arrangements where any particular arrangement of layers is shown, alternate ordering of layers is within the scope of the invention. Notwithstanding this, one aspect of the invention includes the particular advantages realized by a non-brittle polymer immediately adjacent the current collector or thin intermediate layer(s).

In some embodiments, multi-layered structures protect the electroactive layer better than any individual layer that is included in the structure. For instance, each of the layers of a multi-layered structure, e.g., the single-ion conducting layers or the polymer layers, may possess desirable properties, but at the same time may be most effective when complemented by other components with different properties. For example, single-ion conducting layers may include defects such as pinholes and/or roughness, and may crack when handled. Polymer layers, and especially crosslinked polymer layers, for example, can provide very smooth surfaces, may add strength and flexibility, and may be electron insulating, but may pass certain solvents and/or liquid electrolytes. In other embodiments, the polymer layer may be conductive to electrons. Accordingly, these are examples of layers that can complement each other in an overall improved protective structure.

Accordingly, certain embodiments include a multi-layered electrode protective structure that provides many advantages over existing electrode protective structures. Multi-layered protective structures may be designed to minimize defects that might otherwise exist inherently in prior electrode protective structures, or that might exist inherently in electrode protective structures using the same or similar materials as those used in protective structures of the current invention, but arranged differently. For example, single ion-conductive layers (or other components of a device as described herein) may include pinholes, cracks and/or grain boundary defects. Once these defects are formed, they can grow/propagate through the entire thickness of the film as the film grows and may become worse as the film grows thicker. By separating thin single ion-conductive layers from each other with thin, pinhole free, smooth polymer layers, the defect structure in each single ion-conductive layer can be decoupled from the defect structure in every other single ion-conductive layer by an intervening polymer layer. Thus, at least one or more of the following advantages are realized in such a structure: (1) it is less likely for defects in one layer to be directly aligned with defects in another layer, and typically any defect in one layer is substantially non-aligned with a similar defect in another layer; (2) any defects in one single ion-conductive layer typically are much smaller and/or less detrimental than they would otherwise be in a thicker layer of otherwise similar or identical material.

Where alternating single-ion conductive layers and polymer layers are deposited atop each other in a fabrication process, each single-ion conductive layer has a smooth, pinhole free, polymer surface upon which to grow. In contrast, where the single-ion conductive layer to be deposited atop another single-ion conductive layer (or continuously deposited as a single, thicker layer), defects in an underlying layer can serve to instigate defects in growth in a layer deposited atop an underlying layer. That is, whether a protective structure is built with thicker single-ion conductive layers or multiple single-ion conductive layers atop each other, defects can propagate through the thickness, or from layer to layer, as the structure grows, resulting in larger defects, and defects that propagate directly or substantially directly throughout the entire structure. In this arrangement, the single ion-conductive layers can also grow with fewer defects than would occur if they were deposited directly onto the rougher Li or electrolyte layers, particularly where the arrangement in which the first layer of the protective structure closest to the current collector is the polymer layer. Accordingly, in this arrangement, ion-conductive layers can be made that have overall fewer defects, defects that are not aligned with defects in nearest other ion-conductive layers and, where defects exist, they are typically significantly less detrimental (e.g., smaller) than would otherwise exist in a continuously-grown, thicker structure or layers of the same or similar material deposited on top of each other.

A multi-layered protective structure can act as a superior permeation barrier by decreasing the direct flow of species (e.g., electrolyte, salts, cathode discharge products, active cathode products, and polysulfide species) to the Li anode, since these species have a tendency to diffuse through defects or open spaces in the layers. Consequently, dendrite formation, self discharge, and loss of cycle life can be reduced.

Another advantage of a multi-layered structure includes the mechanical properties of the structure. The positioning of a polymer layer adjacent a single-ion conductive layer can decrease the tendency of the single-ion conductive layer to crack, and can increase the barrier properties of the structure. Thus, these laminates may be more robust towards stress due to handling during the manufacturing process than structures without intervening polymer layers. In addition, a multi-layered structure can also have an increased tolerance of the volumetric changes that accompany the migration of lithium back and forth from the anode during the cycles of discharge and charge of the cell.

The ability of certain species that can be damaging to the anode (e.g., electrolytes and/or polysulfides) to reach the anode can also be decreased by providing repeated layers of single-ion conductive layers and polymer layers in a multi-layered structure. When a species encounters a defect-free portion of a single-ion conductive layer, transport of the species towards the anode is possible if the species diffuses laterally through a very thin polymer layer to encounter a defect in a second single-ion conductive layer. Since lateral diffusion through ultra-thin layers is very slow, as the number of single-ion conductive/polymer layer pairs increases, the rate of diffusion of species becomes extremely small (e.g., the amount of penetration across the layer decreases). For instance, in one embodiment, permeation of a species through polymer/single-ion conductive/polymer 3-layer structures can be reduced by three orders of magnitude over a single single-ion conductive layer alone (e.g., even though layers alone may have poor barrier properties). In another embodiment, a polymer/single-ion conductive/polymer/single-ion conductive/polymer 5-layer structure may have more than five orders of magnitude reduction of permeation of a species compared to that in a single single-ion conductive layer.

By contrast, permeation of the same species through a double-thick single-ion conductive layer may actually increase. These significant reductions in permeation of destructive species through the protective structure can increase as the number of layers increases where the thickness of individual layers decreases. That is, in comparison to a two-layer structure of a single-ion conductive layer and polymer layer of a particular, overall thickness, a ten-layer structure of alternating single-ion conductive layers and polymer layers of the same overall thickness may vary significantly decreased permeation of unwanted species through the layer. Because of the significant advantage realized by the protective structure described herein, overall lower amounts of material can be used in a particular protective structure, as compared to certain prior art structures. Accordingly, at a particular level of electrode protection needed in a particular battery arrangement, a significantly smaller mass of overall electrode stabilization materials can be employed, significantly reducing overall battery weight.

In some embodiments described herein, a protective structure may include single-ion conductive layers (e.g., as part of a multi-layered structure) that are treated with a transport-inhibiting substance which can be a polymer or other species such that any nanopores and/or pinholes of the single-ion conductive layer are at least partially filled with the polymer. This filling creates an infiltrated porous barrier material (IPBM), which can increase the barrier properties of the layer by decreasing the rate of transport of certain species (e.g., electrolyte, water, and oxygen) towards the anode.

Advantageously, the filled single-ion conductive layer can have a combination of low permeability and high flexibility, due to the resultant network of infiltrating transport-inhibiting substance. The higher elastic modulus of such a species, when a polymer is selected, relative to the brittle compounds that may be used for the single-ion conductive layer can provide flexibility in the IPBM, as well as a resistance to fracture, that is not possible with certain single-ion conductive materials alone. Polymers having physical characteristics as described elsewhere herein can be used for such infiltrating species. This flexibility without fracture may improve adhesion between the infiltrated polymer and the internal surfaces of the single-ion conductive material is increased due to the high surface energy of the single-ion conductive material prior to infiltration.

In one embodiment, a single-ion conductive layer is infiltrated with a monomeric precursor of the transport-inhibiting substance, so that the porous structure is effectively filled with the monomer, the monomer being driven into the nanoporous regions of the porous single-ion conductive layer by the high surface energy present on the single-ion conductive layer's internal surfaces. The single-ion conductive material may be treated with an activation process before treatment with the monomer, so that surface energy within the material becomes unusually high, relative to that achievable in normal atmospheric processes.

In some instances, monomer vapor can be condensed onto the single-ion conductive material layer, whereby it is then able to wick along the internal surfaces of the single-ion conductive material layer, until all, or some useful portion of, such available tortuous by-paths of permeation are filled by the monomer. A subsequent curing step, either photo-initiated techniques, plasma treatment, or an electron beam, can then be introduced for polymerization of the infiltrated monomer. The particular cure method utilized will depend on the specific choice of materials and the layer thickness, amongst other variables.

Suitable material used as the transport-inhibiting substance includes material known to fully or partially inhibit (or determined to inhibit through simple screening) transport of a particular unwanted species through the material. As mentioned, material may also be selected according to physical properties, including properties adding flexibility and/or strength to the overall material with which it is combined. Specific examples of materials include, as noted, polymers described herein for use as layers in the multi-layered structure, and/or other polymeric or other species. Where hydrophobicity is desirably added to the overall arrangement, one way to do so is to use an infiltrating transport-inhibiting substance having some degree of hydrophobic character.

Formation of IPBM-type structures may be accomplished by a variety of means; however, in some embodiments, the IPBM is formed by vacuum vapor deposition methods and apparatus readily available in prior art manufacturing processes. Accordingly, an IPBM may be formed utilizing a variety of prior art vapor sources for the IPBM material. The inorganic vapor source may comprise any appropriate source of the prior art, including but not limited to sputtering, evaporation, electron-beam evaporation, chemical vapor deposition (CVD), plasma-assisted CVD, etc. The monomer source may be in the form of vapor, or a liquid (e.g., depending on the size of the pores to be filled, the energy of the surface on which the monomer is deposited, among other factors). A monomer vapor source may be any suitable monomer vapor source including but not limited to flash evaporation, boat evaporation, Vacuum Monomer Technique (VMT), polymer multilayer (PML) techniques, evaporation from a permeable membrane, or any other source found effective for producing a monomer vapor. For example, the monomer vapor may be created from various permeable metal frits, as previously in the art of monomer deposition. Such methods are taught in U.S. Pat. No. 5,536,323 (Kirlin) and U.S. Pat. No. 5,711,816 (Kirlin), amongst others. In some cases, atmospheric coating of polymers/monomers can be used such as some liquid-based coating techniques.

A separate activation may be utilized in some cases for providing additional activation energy during or after deposition of the single-ion conductive material layer. In some cases, such as in certain types of unbalanced magnetron sputtering, plasma immersion, or plasma-enhanced CVD, a separate activation source may not be required, as the sufficient activation is already attained by the deposition method itself. Alternatively, certain types of single-ion conductive materials, such as those that provide catalytic or low work function surfaces, e.g., $ZrO_2$, $Ta_2O_5$, or various oxides and fluorides of Group IA and Group IIA metals, may provide sufficient activation even in relatively non-activating deposition processes.

Not all of the surface area within a single-ion conductive material layer need be infiltrated by the transport-inhibiting substance to achieve an effective permeation barrier. Accordingly, it is not required that all of the pores within the single-ion conductive material layer be filled. In some cases, less than 10%, less than 25%, less than 50%, less than 75%, or less than 90%, of the pores and/or pinholes can be filled with a polymer, e.g., to achieve decrease in permeation of certain species across the layer. In some cases, the advantages described above can be obtained so long as those pores that substantially contribute to permeation are substantially filled by the polymer.

In some embodiments, the nanopores/pinholes present in a single-ion conductive layer are in the form of tortuous pathways. The distance, and tortuosity, through which a species would need to pass to penetrate the entire multi-layer arrangement to arrive at the anode may be significant. Where nanopores and pinholes are filled with a penetrating transport-inhibiting substance such as an inhibiting polymeric substance, transport is significantly slowed. This, combined with tortuosity, can result in the exponential decrease in transport of such species and exponential increase in cycle life, as noted above.

Increasing the number of layers, with resultant offset of pinholes existing in ion-conductive materials, may create this tortuous pathway. Where a single layer of such material is used, pinholes can be substantially more easily traversed by unwanted species accessing the electrode. In certain embodiments, the transport-inhibiting substance fills essentially all voids including pinholes and nanopores of the single ion-conducting material, and/or that of the polymer layers. In other arrangements, only a portion of voids of one or both are filled. In some cases, the transport-inhibiting substance is an auxiliary substance, that is, a substance not native to the single ion-conducting material, and/or that of the polymer layers. That is, the material may be a species not forming a portion of one of these components as these components would otherwise be fabricated and assembled together, but is present only through an auxiliary process required to fill such voids. In some cases, the material is not native to either the single-ion conductive material or the polymeric material. The material may be conductive to ions, or substantially non-conductive to ions (e.g., lithium ions), and may be electrically insulating or electrically conductive.

In some embodiments, protective structures include an outer layer, e.g., an outer-most layer that is in contact with the electrolyte of the cell. This outer layer can be a layer such as the outer layer shown in the figures, or can be an auxiliary outer layer specifically selected to interface directly with the electrolyte. Where such an auxiliary outer layer is used, it may be selected to be significantly hydrophobic when used in connection with an aqueous electrolyte and a rechargeable lithium battery. Outer layers may be selected for properties such as Li-ion conduction, electron conduction, protection of underlying layers which may be unstable to components present in the electrolyte, nonporous to prevent penetration by electrolyte solvents, compatible with electrolyte and the underlying layers, and flexible enough to accommodate for volume changes in the layers observed during discharge and charge. The outer layer should further be stable and preferably insoluble in the electrolyte.

Examples of suitable outer layers include, but are not limited to, organic or inorganic solid polymer electrolytes, polymer gels, electrically and ionically conducting polymers, and metals with certain lithium solubility properties. In one embodiment, the polymer of the outer layer is selected from the group consisting of electrically conductive polymers, ionically conductive polymers, sulfonated polymers, and hydrocarbon polymers. Further examples of suitable polymers for use in the outer layer of a protective structure are those described in U.S. Pat. No. 6,183,901 to Ying et al.

As described herein, in some embodiments, a protective structure includes a polymer layer. In one specific embodiment, the polymer is particularly pliable and/or elastic (non-brittle) to provide a particularly durable, robust, rechargeable battery. In this arrangement the polymer can have at least one of the following properties, or a combination of any number of these properties: a Shore A hardness of less than 100, less than 80, less than 60, less than 40, or less than 20, (or a Shore A hardness between 0 and 10, between 10 and 20, between 20 and 30, between 30 and 40, between 40 and 50, between 50 and 60, between 60 and 70, between 70 and 80, between 80 and 90, or between 90 and 100), or a Shore D hardness of less than 100, less than 80, less than 60, less than 40, or less than 20 (or a Shore D hardness between 0 and 10, between 10 and 20, between 20 and 30, between 30 and 40, between 40 and 50, between 50 and 60, between 60 and 70, between 70 and 80, between 80 and 90, or between 90 and 100); a Young's Modulus (elastic modulus) of less than 10 GPa, less than 5 GPa, less than 3 GPa, less than 1 GPa, less than 0.1 GPa, or less than 0.01 GPa (or a Young's Modulus between 0.01 and 0.1 GPa, between 0.1 and 1 GPa, between 1 and 2.5 GPa, between 2.5 and 5 GPa); and an average fracture toughness of greater than $0.1$ MN/m$^{3/2}$, greater than $0.5$ MN/m$^{3/2}$, greater than $1.0$ MN/m$^{3/2}$, greater than $2.0$ MN/m$^{3/2}$, greater than $3.0$ MN/m$^{3/2}$, or greater than $5$ MN/m$^{3/2}$ (e.g., as measured at room temperature and atmospheric pressure). Appropriate polymers may also be chosen based on one or more properties relevant to use in an environment as described herein, such as: glass transition temperature ($T_g$), melting point ($T_m$), strength (e.g., compressional, tensile, flexural, and yield strength), elongation, plasticity, and hardness (e.g., as measured by a Shore A or Shore D durometer, or the Rockwell hardness test).

The thickness of a polymer layer (e.g., within a multi-layered structure) may vary over a range from 10 nm to 10 microns. For instance, the thickness of the polymer layer may be between 50 nm-100 nm, 50 nm-200 nm, between 70 nm-130 nm, between 0.1-1 microns, between 1-5 microns, or between 5-10 microns. The thickness of a polymer layer may be less than or equal to, e.g., 10 microns thick, less than or equal to 7 microns, less than or equal to 5 microns, less than or equal to 2.5 microns, less than or equal to 1 micron, less than or equal to 500 nm, less than or equal to 200 nm, less than or equal to 150 nm, less than or equal to 100 nm, less than or equal to 75 nm, or less than or equal to 50 nm. In some embodiments, a polymer layer is at least 10 nm thick, at least 50 nm thick, at least 100 nm thick, at least 200 nm thick, at least 500 nm thick, at least 1 micron thick, at least 2.5 microns thick, at least 5 microns thick, or at least 7 microns thick. Other thicknesses are also possible. Combinations of the above-noted ranges are also possible.

In some embodiments including a multi-layered structure having more than one polymer layer, the thicknesses of the polymer layers can vary within the structure. For instance, in some cases, the polymer layer closest to the anode layer (e.g., a Li reservoir) is thicker than the other polymer layers of the structure. This embodiment can, for example, stabilize the anode by allowing lithium ions to plate out more uniformly across the surface of the anode during charge.

Suitable polymer layers for use in a multi-layered structure may include polymers that are highly conductive towards lithium (and, in some embodiments, minimally conductive towards electrons) include. Non-limiting examples of polymers include ionically conductive polymers, sulfonated polymers, and hydrocarbon polymers. The selection of the polymer will be dependent upon a number of factors including the properties of electrolyte and cathode used in the cell. Suitable ionically conductive polymers include, e.g., ionically conductive polymers known to be useful in solid polymer electrolytes and gel polymer electrolytes for lithium electrochemical cells, such as, for example, polyethylene oxides. Suitable sulfonated polymers include, e.g., sulfonated siloxane polymers, sulfonated polystyrene-ethylene-butylene polymers, and sulfonated polystyrene polymers. Suitable hydrocarbon polymers include, e.g., ethylene-propylene polymers, polystyrene polymers, and the like.

Polymer layers of a multi-layered structure can also include crosslinked polymer materials formed from the polymerization of monomers such as alkyl acrylates, glycol acrylates, polyglycol acrylates, polyglycol vinyl ethers, polyglycol divinyl ethers, and those described in U.S. Pat. No. 6,183,901 to Ying et al. of the common assignee for protective coating layers for separator layers. For example, one such crosslinked polymer material is polydivinyl poly (ethylene glycol). The crosslinked polymer materials may further comprise salts, for example, lithium salts, to enhance ionic conductivity. In one embodiment, the polymer layer of the multi-layered structure comprises a crosslinked polymer.

Other classes polymers that may be suitable for use in a polymer layer include, but are not limited to, polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyamides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

The mechanical and electronic properties (e.g., conductivity, resistivity) of these polymers are known. Accordingly, those of ordinary skill in the art can choose suitable polymers for use in lithium batteries, e.g., based on their mechanical and/or electronic properties (e.g., ionic and/or electronic conductivity), and/or can modify such polymers to be ionically conducting (e.g., conductive towards single ions) and/or electronically conducting based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

A polymer layer may be deposited by method such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating techniques. A method for depositing cross-linked polymer layers includes flash evaporation methods, for example, as described in U.S. Pat. No. 4,954,371 to Yializis. A method for depositing crosslinked polymer layers comprising lithium salts may include flash evaporation methods, for example, as described in U.S. Pat. No. 5,681,615 to Affinito et al. The technique used for depositing polymer layers may depend on the type of material being deposited, the thickness of the layer, etc.

As described herein, in some embodiments, a protective structure includes a single-ion conductive layer. In many embodiments described herein, the single-ion conductive layer is non-electroactive, but may allow passage of alkali metal ions (e.g., lithium ions) across it.

In some embodiments, the single-ion conductive material is non-polymeric. The single-ion conductive material may be insulating in some embodiments. E.g., in certain embodiments, the single-ion conductive material is defined in part or in whole by a layer that is highly conductive toward lithium ions and minimally conductive toward electrons. In other words, the single-ion conductive material may be one selected to allow lithium ions, but to impede electrons, from passing across the layer. In other embodiments, the single-ion conductive layer may be highly conductive to both ions and electrons.

In some embodiments, the single-ion conductive layer is in the form of a metal layer (e.g., a non-electroactive metal layer). The metal layer may comprise a metal alloy layer, e.g., a lithiated metal layer especially in the case where a lithium anode is employed. In some cases, a semiconductor alloy layer can be used. The lithium content of the metal or semiconductor alloy layer may vary from, e.g., 0.5% by weight to 20% by weight, depending, for example, on the specific choice of metal, the desired lithium ion conductivity, and the desired flexibility of the metal alloy layer. Suitable metals for use in the single-ion conductive material include, but are not limited to, Al, Zn, Mg, Ag, Pb, Cd, Bi, Ga, In, Ge, Sb, As, and Sn. Sometimes, a combination of metals, such as the ones listed above, may be used in a single-ion conductive material.

In other embodiments, the single-ion conductive material may include a ceramic layer, for example, a single ion conducting glass conductive to lithium ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Single-ion conductive layers may include glassy-ceramic layers or glassy layers comprising a material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., Li$_2$O, LiO, LiO$_2$, LiRO$_2$, where R is a rare earth metal), lithium oxide/carbonate mixtures, lithium lanthanum oxides, lithium titanium oxides, lithium borosulfides, lithium aluminosulfides, lithium sulfides (e.g., Li$_2$S, Li$_2$S$_x$, where x is an integer <8), lithium phosphosulfides, and combinations thereof. In one embodiment, the single-ion conductive layer comprises a lithium phosphorus oxynitride in the form of an electrolyte. In other embodiments, the single-ion conductive layer comprises silicon or other semiconductors. Combinations of the above-referenced materials are also possible (e.g., a lithium nitride and a lithium oxide). Combinations of materials may be used, for example, to reduce surface roughness of the layer(s). The selection of the single ion conducting material will be dependent on a number of factors including, but not limited to, the properties of electrolyte and cathode used in the cell.

For cells used in a water and/or air environment, such as a rechargeable battery with an aqueous-based electrolyte, the single-ion conductive material may be constructed so as to impede the passage of hydrogen ions (protons) across its layer. For instance, during discharge protons may move against the electric field in a protective structure (e.g., a multi-layered structure) of a cell. However, during charge, the electric field may accelerate the penetration of protons across the protective structure. Eventually protons may reach a Li anode layer and generate, e.g., hydrogen gas or other species, which may form bubbles and can cause delamination, or other undesirable effects, in a multi-layered structure. As discussed in more detail herein, the single-ion conductive layer may be combined with other materials (e.g., impregnated with a polymer) to impede the passage of hydrogen ions and/or or electrons, while permitting the passage of lithium ions in some embodiments.

In one particular embodiment in which an electrode is to be used with an aqueous-based electrolyte, the electrode protective structure can be made to be substantially impermeable to water. This can be done by selecting one or more materials that are sufficiently hydrophobic or otherwise impede water transport. For example, a protective structure may include a layer (e.g., a top layer closest to the electrolyte) that is significantly hydrophobic so as to prevent water passage. In one arrangement, an intermediate layer (e.g., 44, 52, 42, etc.) can be made sufficiently hydrophobic to block water passage. In another arrangement, none of the layers individually is sufficiently hydrophobic or otherwise formulated to substantially prevent water passage but, together the layers substantially prevent water passage. For example, each layer, or some combination or subcombination of layers, can be made somewhat hydrophobic so that each repels water to some extent. In this arrangement, the combination of the layers can be formulated and/or selected to substantially prevent water passage overall.

One measure of hydrophobicity that can be useful in selecting such materials is contact angle measurements taken between water and a candidate material. While "hydrophobic" can be considered a relative term in some cases, a particular degree or amount of hydrophobicity can be easily selected by those of ordinary skill in the art, with the aid of knowledge of the characteristics of particular materials and/or readily-determined contact angle measurements to select materials for construction of an anode stabilization structure which, overall, impedes water passage significantly. "Significantly" in this context, can mean that where an aqueous electrolyte is used, after 100 cycles of a rechargeable device employing the stabilization component water will be completely absent from the electrode under the stabilization component (the side opposite the electrolyte) or, if present, will be present in an amount less than 100 parts per million measured to include all molecular species at that location. In other embodiments, water will be present in an amount less than 75 ppm, less than 50, 25, 10, 5, or 2 ppm.

The thickness of a single-ion conductive layer may vary over a range from 1 nm to 100 microns. For instance, the thickness of the single-ion conductive layer may be between 1-10 nm, between 10-100 nm, between 10-50 nm, between 30-70 nm, between 100-1000 nm, between 1-5 microns, between 5-10 microns, between 10-20 microns, or between 20-100 microns. The thickness of a single-ion conductive layer may be less than or equal to, e.g., 100 microns, less than or equal to 20 microns, less than or equal to 10 microns, less than or equal to 7 microns, less than or equal to 5 microns, less than or equal to 1000 nm, less than or equal to 500 nm, less than or equal to 250 nm, less than or equal to 100 nm, less than or equal to 70 nm, less than or equal to 50 nm, less than or equal to 25 nm, or less than or equal to 10 nm. In some embodiments, a single-ion conductive layer is at least 10 nm thick, at least 30 nm thick, at least 100 nm thick, at least 1 micron thick, at least 2.5 microns thick, at least 5 microns thick, at least 7 microns thick, at least 10 microns thick, at least 20 microns thick, or at least 50 microns thick. Other thicknesses are also possible. Combinations of the above-noted ranges are also possible. In some cases, the single-ion conductive layer has the same thickness as a polymer layer in a multi-layered structure.

The single-ion conductive layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In some embodiments, single-ion conducting layers can be treated with a polymer such that pinholes and/or nanopores of the single-ion conducting layers may be filled with the polymer. Such embodiments can impede the diffusion of certain species (e.g., electrolyte and/or polysulfides) towards the anode, e.g., by increasing the distance, and tortuosity, through which such a species would need to pass to penetrate the entire multi-layer arrangement to arrive at the electroactive layer, as described in more detail herein.

In certain embodiments, the layers of a protective structure are highly conductive to metal ions to facilitate the formation of an electroactive layer. One or more, or all, layers of a protective structure, such as a single-ion conductive layer and/or a polymer layer, may have a metal ion conductivity of between, for example, $1*10^{-9}$ $ohm^{-1} \cdot cm^{-1}$ and $1*10^{-1}$ $ohm^{-1} \cdot cm^{-1}$ (e.g., between $1*10^{-7}$ $ohm^{-1} \cdot cm^{-1}$ and $1*10^{-2}$ $ohm^{-1} \cdot cm^{-1}$, between $1*10^{-6}$ $ohm^{-1} \cdot cm^{-1}$ and $1*10^{-2}$ $ohm^{-1} \cdot cm^{-1}$, or between $1*10^{-5}$ $ohm^{-1} \cdot cm^{-1}$ and $1*10^{-2}$ $ohm^{-1} \cdot cm^{-1}$). In some instances, one or more, or all, layers of a protective structure (e.g., a single-ion conductive layer and/or a polymer layer) may have a metal ion conductivity of, for example, greater than or equal to $1*10^{-9}$ $ohm^{-1} \cdot cm^{-1}$, greater than or equal to $5*10^{-9}$ $ohm^{-1} \cdot cm^{-1}$, greater than or equal to $1*10^{-8}$ $ohm^{-1} \cdot cm^{-1}$, greater than or equal to $5*10^{-8}$ $ohm^{-1} \cdot cm^{-1}$, greater than or equal to $1*10^{-7}$ $ohm^{-1} \cdot cm^{-1}$, greater than or equal to $5*10^{-7}$ $ohm^{-1} \cdot cm^{-1}$, greater than or equal to $1*10^{-6}$ $ohm^{-1} \cdot cm^{-1}$, greater than or equal to $5*10^{-6}$ $ohm^{-1} \cdot cm^{-1}$, greater than or equal to $1*10^{-5}$ $ohm^{-1} \cdot cm^{-1}$, greater than or equal to $5*10^{-5}$ $ohm^{-1} \cdot cm^{-1}$, greater than or equal to $1*10^{-4}$ $ohm^{-1} \cdot cm^{-1}$, greater than or equal to $5*10^{-4}$ $ohm^{-1} \cdot cm^{-1}$, greater than or equal to $1*10^{-3}$ $ohm^{-1} \cdot cm^{-1}$, greater than or equal to $5*10^{-3}$ $ohm^{-1} \cdot cm^{-1}$, greater than or equal to $1*10^{2}$ $ohm^{-1} \cdot cm^{-1}$, greater than or equal to $5*10^{-2}$ $ohm^{-1} \cdot cm^{-1}$. In some embodiments, one or more, or all, layers of a protective structure (e.g., a single-ion conductive layer and/or a polymer layer) may have a metal ion conductivity of, for example, less than $5*10^{-2}$ $ohm^{-1} \cdot cm^{-1}$, less than $5*10^{-3}$ $ohm^{-1} \cdot cm^{-1}$, less than $5*10^{-4}$ $ohm^{-1} \cdot cm^{-1}$, less than $5*10^{-5}$ $ohm^{-1} \cdot cm^{-1}$, less than $5*10^{-6}$ $ohm^{-1} \cdot cm^{-1}$, less than $5*10^{-7}$ $ohm^{-1} \cdot cm^{-1}$, or less than $5*10^{-8}$ $ohm^{-1} \cdot cm^{-1}$. Other metal ion conductivities are also possible. Combinations of the above-noted ranges are also possible (e.g., a material having a metal ion conductivity of greater than or equal to $1*10^{-8}$ $ohm^{-1} \cdot cm^{-1}$ and less than $1*10^{-2}$ $ohm^{-1} \cdot cm^{-1}$).

It should be appreciated that one or more single-ion conductive layers may each have the same ion conductivity or different ion conductivies in the ranges noted above, and one or more polymer layers may each have the same ion conductivity or different ion conductivies in the ranges noted above. Additionally, the ion conductivities of the single-ion conductive layers may be the same or different from those of the polymer layers. In some cases, each layer of a multi-layered structure has an ion conductivity in one or more of the ranges noted above (e.g., greater than or equal to $1*10^{-5}$ $ohm^{-1} \cdot cm^{-1}$, greater than or equal to $5*10^{-5}$ $ohm^{-1} \cdot cm^{-1}$, or greater than or equal to $1*10^{-4}$ $ohm^{-1} \cdot cm^{-1}$).

As noted above, a variety of ion-conductive species, and polymeric species, are useful in connection with the invention. In some cases, ion conductive species that are also electrically conductive are employed. In other cases, ion conductor species that are substantially non-electrically conductive are employed.

Examples of ion conductor species, including single-ion-conductive species suitable for use in the invention, which are also substantially electrically conductive, include lithium alloys such as lithium combined with Group 14 and Group 15 metals (e.g., Ge, Sn, Pb, As, Sb, Bi). Polymers that are conductive to single ions that are also substantially electrically conductive include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(paraphenylene vinylene)s.

Electrically-conductive additives may also be added to polymers (or single-ion conductive materials) to form electrically-conductive layers. Certain electrically conductive materials may have an electron conductivity of, e.g., greater than or equal to $10^{-2}$ ohm$^{-1}$·cm$^{-1}$, greater than or equal to $10^{-1}$ ohm$^{-1}$·cm$^{-1}$, greater than or equal to 1 ohm$^{-1}$·cm$^{-1}$, greater than or equal to 10 ohm$^{-1}$·cm$^{-1}$, greater than or equal to $10^2$ ohm$^{-1}$·cm$^{-1}$, greater than or equal to $10^3$ ohm$^{-1}$·cm$^{-1}$, greater than or equal to $10^4$ ohm$^{-1}$·cm$^{-1}$, or greater than or equal to $10^5$ ohm$^{-1}$·cm$^{-1}$. In some embodiments, a material may have an electron conductivity of, e.g., less than $10^5$ ohm$^{-1}$·cm$^{-1}$, less than $10^4$ ohm$^{-1}$·cm$^{-1}$, less than $10^3$ ohm$^{-1}$·cm$^{-1}$, less than $10^2$ ohm$^{-1}$·cm$^{-1}$, less than 10 ohm$^{-1}$·cm$^1$, less than 1 ohm$^{-1}$·cm$^1$, less than $10^{-1}$ ohm$^{-1}$·cm$^{-1}$, or less than $10^{-2}$ ohm$^{-1}$·cm$^{-1}$. Other conductivities are also possible. Combinations of the above-referenced ranges are also possible (e.g., a material having an electron conductivity of greater than or equal to $10^{-2}$ ohm$^{-1}$·cm$^{-1}$ and less than $10^2$ ohm$^{-1}$·cm$^{-1}$).

Examples of ion-conductive species that are substantially non-electrically conductive include non-electrically conductive materials (e.g., electrically insulating materials) that are doped with lithium salts, such as those described herein. For example, acrylate, polyethyleneoxide, silicones, polyvinylchlorides, and other insulating polymers that are doped with lithium salts can be ion-conductive but substantially non-electrically conductive.

In some embodiments, single-ion conductive materials can also include non-polymeric materials. Certain non-electrically conductive materials may have a resistivity of, e.g., greater than or equal to $10^3$ ohm-cm, greater than or equal to $10^4$ ohm-cm, greater than or equal to $10^5$ ohm-cm, greater than or equal to $10^6$ ohm-cm, greater than or equal to $10^7$ ohm-cm, or greater than or equal to $10^8$ ohm-cm. In some cases, a non-electrically conductive materials may have a resistivity of, e.g., less than $10^8$ ohm-cm, less than $10^7$ ohm-cm, less than $10^6$ ohm-cm, less than $10^5$ ohm-cm, less than $10^4$ ohm-cm, or less than $10^3$ ohm-cm. Other resistivities are also possible. Combinations of the above-referenced ranges are also possible.

Those of ordinary skill in the art can select single ion conductive species that are both substantially electrically conductive and substantially non-electrically conductive without undue experimentation, and can employ a simple screening test to select from candidate materials. The simple screening test involves positioning a material as a separator in an electrochemical cell which, to function, requires passage of both an ionic species and electrons across the material. This is a simple test to employ. If the material is substantially ionically conductive and electronically conductive in this test, then resistance or resistivity across the material will be low. Other simple tests can be conducted by those of ordinary skill in the art.

In general, polymeric materials can also be selected or formulated to have physical/mechanical characteristics as described above by, for example, tailoring the amounts of components of polymer blends, adjusting the degree of cross-linking (if any), etc. Simple screening tests such as those described above can be used to select polymers that have the appropriate ionic and/or electronic properties.

The electroactive layer formed by the methods described herein may comprise a base electrode material such as lithium metal. The lithium metal may be in the form of a lithium alloy such as, for example, a lithium-tin alloy or a lithium aluminum alloy in some embodiments. Other alkali metals can also be used as electroactive materials.

The thickness of the electroactive layer may vary from, e.g., 2 to 500 microns. For instance, the electroactive layer may have a thickness of less than or equal to 500 microns, less than or equal to 200 microns, less than or equal to 150 microns, less than or equal to 100 microns, less than or equal to 75 microns, less than or equal to 50 microns, less than or equal to 40 microns, less than or equal to 30 microns, less than or equal to 25 microns, less than or equal to 10 microns, or less than or equal to 5 microns. In some embodiments, the electroactive layer may have a thickness of greater than or equal to 2 microns, greater than or equal to 5 microns, greater than or equal to 10 microns, greater than or equal to 15 microns, greater than or equal to 20 microns, greater than or equal to 30 microns, greater than or equal to 40 microns, greater than or equal to 50 microns, greater than or equal to 75 microns, greater than or equal to 100 microns, greater than or equal to 150 microns, or greater than or equal to 200 microns, or greater than or equal to 300 microns. The choice of the thickness may depend on cell design parameters such as the excess amount of lithium desired, cycle life, and the thickness of the cathode electrode. In one embodiment, the thickness of the electroactive layer is in the range of 2 to 100 microns (e.g., 5 to 50 microns, 5 to 25 microns, 10 to 25 microns, or 5 to 30 microns). Other ranges of thicknesses are also possible. Combinations of the above-referenced ranges are also possible.

An electrode can function with any of a variety of current collectors. As described herein, the surface of the current collector may be very smooth so that additional layer(s) deposited on top of the current collector are also smooth. Current collectors are well known to those of ordinary skill in the art and can be readily selected from suitable materials based on general knowledge in the art in combination with this disclosure. In one arrangement, a current collector addresses the bottom surface of an electrode or electrode precursor (e.g., at a side opposite a protective structure). In another arrangement, an edge collector is used, which can be positioned on one or multiple edges, i.e., a side of multiple layers that may for an electrode. In yet another arrangement, a current collector can be pierced (e.g., vertically) through the layers of the electrode. For instance, the vertical current collector may be substantially perpendicular to and in contact with each of the layers of the protective structure. In other arrangements, both a bottom collector and one or more edge collectors and/or a vertical current collectors can be used. Where only a bottom collector is used, the layers of the electrode may be electronically conductive as well as lithium ion conductive. Where an edge collector is used, certain layers of the electrode may be selected to substantially inhibit electron passage.

A current collector is useful in efficiently collecting the electrical current generated throughout an electrode and in providing an efficient surface for attachment of the electrical contacts leading to the external circuit. A wide range of current collectors are known in the art. Suitable current collectors may include, for example, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein.

In some embodiments, the current collector includes one or more conductive metals such as aluminum, copper, chromium, stainless steel and nickel. For example, a current collector may include a copper metal layer. Optionally, another conductive metal layer, such as titanium may be positioned on the copper layer. The titanium may promote adhesion of the copper layer to another material, such as an electroactive material layer. Other current collectors may include, for example, expanded metals, metal mesh, metal grids, expanded metal grids, metal wool, woven carbon fabric, woven carbon mesh, non-woven carbon mesh, and carbon felt. Furthermore, a current collector may be electrochemically inactive. In other embodiments, however, a current collector may comprise an electroactive material.

A current collector may be positioned on a surface (e.g., a surface of a substrate or any other suitable layer) by any suitable method such as lamination, sputtering, and vapor deposition. In some cases, a current collector is provided as a commercially available sheet that is laminated with one or more electrochemical cell components. In other cases, a current collector is formed during fabrication of the electrode by depositing a conductive material on a suitable surface.

A current collector may have any suitable thickness. For instance, the thickness of a current collector may be, for example, between 0.1 to 50 microns (e.g., between 0.1 and 0.5 microns thick, between 0.1 and 0.3 microns thick, between 0.1 and 2 microns thick, between 1-5 microns thick, between 5-10 microns thick, between 5-20 microns thick, or between 10-50 microns thick). In certain embodiments, the thickness of a current collector is, e.g., 20 microns or less, 12 microns or less, 10 microns or less, 7 microns or less, 5 microns or less, 3 microns or less, 1 micron or less, 0.5 micron or less, or 0.3 micron or less. In some cases, the thickness of a current collector may be, for example, greater than 0.1 microns, greater than 0.5 microns, greater than 1 micron, greater than 0.5 microns, greater than 2 microns, greater than 2 microns, As described herein, in some cases an article may include one or more intervening layers positioned between a protective structure and a current collector. In some embodiments, an intervening layer comprises a metal. In other cases, an intervening layer comprises a semiconductor. Materials that may be suitable for use in an intervening layer include, for example, a Group 1-17 element, a Group 2-14 element, or a Group 2, 10, 11, 12, 13, 14, 15 element. Suitable elements from Group 2 of the Periodic Table may include beryllium, magnesium, calcium, strontium, and barium. Suitable elements from Group 10 may include, for example, nickel, palladium, or platinum. Suitable elements from Group 11 may include, for example, copper, silver, or gold. Suitable elements from Group 12 may include, for example, zinc, cadmium, or mercury. Elements from Group 13 that may be used in the present invention may include, for example, boron, aluminum, gallium, indium, or thallium. Elements from Group 14 that may be used in the present invention may include, for example, carbon, silicon, germanium, tin, or lead. Elements from Group 15 that may be used in the present invention may include, for example, nitrogen, phosphorus, or bismuth. In some cases, the intervening layer comprises Al, Mg, Zn, or Si.

Where an intervening layer comprises a metal, it is to be understood that one or more metals can be used. Similarly, where an intervening layer comprises a semiconductor, one or more semiconducting materials can be used. Additionally, metals and semiconductors can be mixed. That is, an intervening layer can be a single metal, a single semiconductor, or one or more metals or one or more semiconductors mixed. Non-limiting examples of suitable metals are listed above, and suitable components of semiconductors are listed above. Those of ordinary skill in the art are well aware of semiconductors that can be formed from one or more of the elements listed above, or other elements.

In certain cases, an intervening layer is formed by a nonmetal. For example, an intervening layer may comprise N, O, or C. In certain embodiments, an intervening layer comprises or is formed of a carbon-containing material such as graphite.

In embodiments where an intervening layer is in the form of a nonmetal, the Li alloy may have a primary phase consisting essentially of Li and a secondary phase consisting essentially of $Li_xZ_y$, and Z, wherein Z is the alloying component.

In some cases, where an intervening layer is present and alloys with lithium, the alloying material (which may include a material suitable for use in an intervening layer) may be present in the electroactive layer in an amount greater than 25 ppm, 50 ppm, 100 ppm, 200 ppm, 300 ppm, 400 ppm or 500 ppm, but less than or equal to 1 wt %, 2 wt %, 5 wt %, 10 wt %, 12 wt %, 15 wt %, or 20 wt % of the electroactive layer. As used herein, "wt % of the electroactive layer" means percent by total weight of the electroactive layer itself, absent current collector, protective structure, electrolyte and other materials.

Combinations of the above-noted materials (e.g., metals, semiconductors, non-metals, carbon-containing materials) can also be used for intervening layers. Moreover, more than one intervening layer (e.g., at least 2, 3, 4, 5 layers) may also be present between a current collector and a protective structure.

It should be appreciated that in some embodiments, an intervening layer may be present in an electrode or an electrochemical cell, but does not alloy with the electroactive material during formation and/or use of the electrode or cell. In other embodiments, the intervening layer may be designed to intercalate ions of the electroactive material. Non-limiting examples of suitable materials that may intercalate ions of an electroactive material (e.g., alkaline metal ions) include carbon (e.g., graphite), titanium sulfide, and iron sulfide. In some cases, an intervening layer comprises silicon and/or germanium.

In other embodiments, an intervening layer includes a layer of lithium. The use of a lithium layer positioned between the current collector and the protective structure may be used as a seed layer to facilitate the formation of an electroactive layer. For instance, under certain conditions, the use of an intervening lithium layer can result in the formation of a smooth electroactive lithium layer. It should be appreciated that in such embodiments, the intervening layer, although it may comprise lithium, is not used as an electroactive layer itself. For instance, the thickness of the intervening layer may be such that it is unsuitable for use as an electroactive layer, but is suitable for use in an electrode or electrochemical cell assembled in a discharged state (e.g., as a seed layer). In some such embodiments, for example, the intervening layer is present in an amount such that the material participates in less than 100%, less than 80%, less than 60%, less than 40%, less than 20%, less than 10%, less than 5%, less than 2%, or less than 1% of a full discharge of the electrochemical cell.

In other embodiments, an intervening layer does not contain an electroactive material, such as lithium. In some cases, the intervening layer does not contain lithium metal. In certain embodiments, the intervening layer (or a reservoir positioned between the current collector and a protective structure) does not contain residual materials (e.g., residual lithium) that would be characteristic of an electrode and/or a cell that has been cycled or spent, or byproducts of compounds that would be characteristic of an electrode and/or cell that has been cycled or spent. In yet other embodiments, no intervening layer is present at all.

The total thickness of the intervening layer(s) positioned between current collector and the protective structure may vary from, for example, between 1 nm and 50 microns. For instance, the total thickness of the intervening layer(s) may be less than or equal to 50 microns, less than or equal to 25 microns, less than or equal to 15 microns, less than or equal to 10 microns, less than or equal to 5 microns, less than or equal to 2 microns, less than 1.8 microns, less than or equal to 1.5 microns, less than or equal to 1 micron, less than or equal to 800 nm, less than or equal to 600 nm, less than or equal to 400 nm, less than or equal to 300 nm, less than or equal to 200 nm, less than or equal to 100 nm, less than or equal to 50 nm, less than or equal to 40 nm, less than or equal to 30 nm, less than or equal to 20 nm, less than or equal to 10 nm, or less than or equal to 5 nm. In some embodiments, the total thickness of the intervening layer(s) may be greater than or equal to 5 nm, greater than or equal to 10 nm, greater than or equal to 20 nm, greater than or equal to 30 nm, greater than or equal to 40 nm, greater than or equal to 50 nm, greater than or equal to 100 nm, greater than or equal to 200 nm, greater than or equal to 300 nm, greater than or equal to 400 nm, greater than or equal to 600 nm, greater than or equal to 800 nm, greater than or equal to 1 micron, or greater than or equal to 1.5 microns, greater than or equal to 2 microns, greater than or equal to 5 microns, greater than or equal to 10 microns, greater than or equal to 15 microns, or greater than or equal to 25 microns. Other ranges of thicknesses are also possible. Combinations of the above-referenced ranges are also possible (e.g., a thickness of less than 50 microns but greater than or equal to 2 microns).

As described herein, an intervening layer(s) may be electroactive in some embodiments, or non-electroactive in other embodiments.

The layers of an electrode and/or electrode precursor (including an intervening layer, if present) described herein may be deposited by any of a variety of methods generally known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

Deposition of the layers may be carried out in a vacuum or inert atmosphere to minimize side reactions in the deposited layers which could introduce impurities into the layers or which may affect the desired morphology of the layers. In some embodiments, the layers of a multi-layered structure are deposited in a continuous fashion in a multistage deposition apparatus.

In some cases, one or more layers of an article may be treated with a plasma, such as $CO_2$ or $SO_2$ induced layers.

The electrode illustrated in FIG. 1 may further comprise a substrate, as is known in the art, adjacent the current collector on a side opposite that of the protective structure. Substrates are useful as a support on which to deposit the current collector and/or protective structure, and may provide additional stability for handling of the article during fabrication. Further, in the case of conductive substrates, a substrate may also function as a current collector useful in efficiently collecting the electrical current generated throughout the electrode and in providing an efficient surface for attachment of electrical contacts leading to an external circuit.

A wide range of substrates are known in the art of electrodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, the substrate may be selected from non-electrically-conductive materials.

The layers of an electrode between and including a current collector and an outer layer of a protective structure may have any suitable total thickness. In some embodiments, the total thickness is less than 2 cm, less than 1.5 cm, less than 1 cm, less than 0.7 cm, less than 0.5 cm, less than 0.3 cm, less than 1 mm, less than 700 microns, less than 500 microns, less than 400 microns, less than 300 microns, less than 250 microns, less than 200 microns, less than 150 microns, less than 100 microns, less than 75 microns, or less than 50 microns, less than 25 microns, or less than 10 microns, e.g., depending on the particular application of the electrode. In some cases, such thicknesses apply to electrodes that do not include an electroactive layer. In other cases, such thicknesses apply to electrodes that do include an electroactive layer.

In some embodiments, an electrode or electrochemical cell described herein has a relatively large area or footprint. For instance, an electrode or electrochemical cell may have a width of at least 1 cm, at least 2 cm, at least 4 cm, at least 6 cm, at least 8 cm, at least 10 cm, at least 12 cm, or at least 15 cm. The electrode or electrochemical cell may have a height of at least 1 cm, at least 2 cm, at least 4 cm, at least 6 cm, at least 8 cm, at least 10 cm, at least 12 cm, or at least 15 cm. As such, relatively large area devices (e.g., 5 cm×5 cm, 10 cm×10 cm) may be formed. Other sizes and dimensions are also possible.

In certain embodiments, an electrode or electrochemical cell described herein can be used in (or designed for) an electrochemical cell that has a particular capacity. In some cases, the capacity of the cell may be, for example, between 1 Amp·hours (Ah) and 30 Ah (e.g., between 1 Ah and 5 Ah, between 5 Ah and 10 Ah, or between 10 Ah and 30 Ah). The capacity of the cell may be, for example, at least 1 Ah, at least 1.5 Ah, at least 2.0 Ah, at least 2.5 Ah, at least 2.8 Ah, at least 3.0 Ah, at least 3.5 Ah, at least 4.0 Ah, at least 5.0 Ah, at least 8.0 Ah, at least 10.0 Ah, at least 12.0 Ah, at least 14.0 Ah, at least 16.0 Ah, at least 18.0 Ah, at least 20.0 Ah, at least 22.0 Ah, or at least 24.0 Ah.

The electrolytes used in electrochemical cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions between the anode and the cathode may be used. The electrolyte may be electronically non-conductive to prevent short circuiting between the anode and the cathode. In one set of embodiments a non-aqueous-based electrolyte is used; in another set of embodiments, an aqueous-based electrolyte is used.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkypyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolane. Fluorinated derivatives of the foregoing are also useful as liquid electrolyte solvents. Mixtures of the solvents described herein can also be used.

In some embodiments, an electrolyte may be present as a polymer layer adjacent a protective structure (e.g., on a side opposite the current collector). In some cases, in addition to being able to function as a medium for the storage and transport of ions, a polymer layer positioned between an anode and cathode can function to screen the anode (e.g., a base electrode layer of the anode) from any cathode roughness under an applied force or pressure, keeping the anode surface smooth under force or pressure, and stabilizing any multi-layered structures of the anode (e.g., ceramic polymer multi-layer) by keeping the multi-layer pressed between the base electrode layer and the smooth polymer layer. In some such embodiments, the polymer layer may be chosen to be compliant and have a smooth surface.

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). As described herein, in some cases an electrolyte is used as a source of an electroactive material precursor.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes described herein include, but are not limited to, LiSCN, LiBr, LiI, LiClO4, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from 0.2 m to 2.0 m (m is moles/kg of solvent). In some embodiments, a concentration in the range between 0.5 m to 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, or inorganic nitrite is used, it may provide ionic conductivity to the electrolyte in which case no additional ionic lithium electrolyte salts may be needed.

As noted herein, in some embodiments an electrode can be used to enhance the lifetime of rechargeable lithium batteries employing aqueous-based electrolytes. As used herein, "aqueous-based electrolyte" means an electrolyte including at least 20%, by weight, water, and more typically at least 50%, 70%, 80%, or 95% or more water by weight. Several additional features described herein may be to assist function in a rechargeable battery useful in an aqueous environment, or an environment exposed to air or oxygen. In the case of an aqueous-based electrolyte, in one set of embodiments the electrolyte is formulated so as to have a pH of at least 7.1, and in other embodiments at least 7.2, 7.3. 7.4., 7.5, 7.6, 7.7, or 7.8 providing an electrolyte in basic form such as this inherently significantly reduces the presence of hydrogen ion which can be destructive if exposed to a lithium or other alkali metal electrode. In some embodiments, the electrolyte may have a pH between 7-8, between 8-9, between 9-10, between 10-11, or between 11-12 prior to the first discharge.

Formulating an electrolyte in basic form can be carried out by those of ordinary skill in the art, without undue experimentation, while providing the electrolyte with the ability to function effectively in the device and not causing inhibitory or other destructive behavior. Suitable basic species that may be added to an aqueous-based electrolyte, employed with a lithium battery, to achieve a basic pH as noted above may depend on, for example, the specific components of the lithium battery, the environment of use (e.g., an air/oxygen or water environment), the method of using the battery (e.g., a primary or secondary battery), etc. Suitable basic species may also be chosen based on the basicity (e.g., pH) of the species, the diffusivity of the species, and/or the likelihood of the species reacting with the electrolyte, other components in the electrolyte, components of the anode (e.g., polymer layers, single ion conductive layers, and electroactive layers), and/or the cathode material. Typically, chemical reaction between the basic species and such components of the battery are avoided. Accordingly, those of ordinary skill in the art can choose an appropriate basic species by, e.g., knowing the components of the battery and the likelihood of reactivity between the species and the components, and/or by a simple screening test.

One simple screening test may include adding the species to the electrolyte in the presence of a material component of the cell, e.g., a single-ion conductive material, and determining whether the species reacts and/or negatively effects the material. Another simple screening test may include adding the species to the electrolyte of the battery in the presence of the battery components, discharging/charging the battery, and observing whether inhibitory or other destructive behavior occurs compared to that in a control system. Other simple tests can be conducted by those of ordinary skill in the art.

Species that may be added to an aqueous-based electrolyte, employed with a lithium battery, to achieve a basic pH as noted above include bases comprising alkali and alkali earth metals (Group 1 and 2 metals, respectively), as well as ammonium-containing species (e.g., ammonium hydroxides, carbonates, and sulfides). Specific examples of species that can be added to an aqueous-based electrolyte to achieve a basic pH include, but are not limited to, ammonia, aniline, methylamine, ethylamine, pyridine, calcium carbonate, calcium hydroxide, ferrous hydroxide, potassium acetate, potassium bicarbonate, potassium carbonate, potassium cyanide, potassium hydroxide, sodium acetate, sodium benzoate, sodium bicarbonate, sodium carbonate, sodium hydroxide, sodium metasilicate, sodium sesquicarbonate, sodium phosphate, sodium hydrogen phosphate, sodium sulfite, sodium cyanide, trisodium phosphate, magnesium hydroxide, barium hydroxide, calcium hydroxide, lithium hydroxide, rubidium hydroxide, cesium hydroxide, and strontium hydroxide. It is routine for those of ordinary skill in the art to determine the amount of such an additive needed to create an electrolyte of desired pH.

In some embodiments, additives that may reduce or prevent formation of impurities and/or depletion of electrochemically active materials including electrodes and electrolyte materials, during charge/discharge of the electrochemical cell, may be incorporated into electrochemical cells described herein.

Any suitable cathode active material for use in a cathode can be used. In some embodiments, cathodes that are typically used with lithium ion batteries can be combined with embodiments described herein. In some cases, a cathode active material includes a lithium-containing metal oxide (including mixed oxides), a lithium-containing transition metal oxide, or a lithium-containing phosphate. Examples of transition metals include Mn, V, Cr, Ti, Fe, Co, Ni, Cu, Y, Zr, Nb, Mo, Ru, Rh, Pd, Ag, Hf, Ta, W, Re, Os, and Ir. Non-limiting examples of materials include lithium manganese oxide, lithium cobalt oxide, lithium nickel oxide, lithium iron phosphate, and lithium vanadium oxide. Specific examples of materials include $LiCoO_2$, $LiMn_2O_4$, $LiNiO_2$, $LiFePO_4$, $Li_2FePO_4F$, $LiCo_{1/3}Ni_{1/3}Mn_{1/3}O_2$, $LiNi_{1-y}Co_yO_2$, and $Li(Li_aNi_xMn_yCo_z)O_2$. In certain embodiments, a material chosen from the ones disclosed herein that are suitable for use in a single-ion conductive layer can be used as an active cathode material.

In some embodiments, suitable cathode active materials for use in a cathode may include electroactive transition metal chalcogenides, electroactive conductive polymers, electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments involving Li/S systems, the sulfur-containing material, in its oxidized form, comprises a polysulfide moiety, $S_m$, selected from the group consisting of covalent $—S_m—$ moieties, ionic $—S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In another embodiment, m of the polysulfide moiety, $S_m$, of the sulfur-containing polymer is an integer equal to or greater than 8. In another embodiment, the sulfur-containing material is a sulfur-containing polymer. In another embodiment, the sulfur-containing polymer has a polymer backbone chain and the polysulfide moiety, $S_m$, is covalently bonded by one or both of its terminal sulfur atoms as a side group to the polymer backbone chain. In yet another embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. patent application Ser. No. 08/995,122 now U.S. Pat. No. 6,201,100 issued Mar. 13, 2001, to Gorkovenko et al. of the common assignee and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al, each of which is incorporated herein by reference in its entirety.

In some cases, a porous cathode may be used, as described in U.S. patent application Ser. No. 13/033,419, filed Feb. 23, 2011, entitled "Porous Structures for Energy Storage Devices", which is incorporated herein by reference in its entirety.

Cathodes may further comprise one or more conductive fillers to provide enhanced electronic conductivity. Examples of conductive fillers include, but are not limited to, those including conductive carbons, graphites, activated carbon fibers, non-activated carbon nanofibers, metal flakes, metal powders, metal fibers, carbon fabrics, metal mesh, and electrically conductive polymers. The amount of conductive filler, if present, may be present in the range of 2 to 30% by weight of the cathode active layer. The cathodes may also further comprise other additives including, but not limited to, metal oxides, aluminas, silicas, and transition metal chalcogenides.

Cathodes may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include polytetrafluoroethylenes (Teflon), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, may be present in the range of 2 to 30% by weight of the cathode active layer.

A cathode used with embodiments described herein may be in a fully charged state, a fully discharged state, or a partially charged/partially discharged state.

In some embodiments, electrochemical cells may further comprise a separator interposed between the cathode and anode. The separator may be a solid non-conductive or insulating material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. Nos. 08/995,089 and 09/215,112 by Carlson et al. of the common assignee. Solid electrolytes and gel electrolytes may also function as a separator in addition to their electrolyte function.

In some embodiments, an electrochemical cell or an electrochemical cell does not include a separator.

As mentioned above, in some embodiments, the articles and methods herein involve the application of force. In some embodiments, the force comprises an anisotropic force with a component normal to a surface of an electrode or electrochemical cell. In the case of a planar surface, the force may comprise an anisotropic force with a component normal to the surface at the point at which the force is applied. For example, referring to FIGS. 1 and 2, a force may be applied in the direction of arrow 60. Arrow 62 illustrates the component of the force that is normal to a surface of the electrode or electrochemical cell. Such a surface may include, for example, a surface of a protective structure, a surface of a current collector, a surface of a substrate, a surface of an electroactive layer (if present), or a surface of any other suitable component of the article. In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to a surface of the electrode or electrochemical cell is applied during at least one period of time during formation of an electrode. In certain embodiments, an anisotropic force with a component normal to a surface of the electrode or electrochemical cell is applied during at least one period of time during charge (and/or discharge). In yet other embodiments, an anisotropic force with a component normal to a surface of the electrode or electrochemical cell is applied during at least one period of time during use of the electrochemical cell (e.g., during charge and/or discharge). In some embodiments, the force may be applied continuously, over one period of time, or over multiple periods of time that may vary in duration and/or frequency. The anisotropic force may be applied, in some cases, at one or more pre-determined locations, optionally distributed over the entire surface (or at least 50%, 60%, 70%, 80%, 90%, or 95% of the surface area) of the component. In some cases, the anisotropic force can be applied to 100% of the surface area of the component. In some embodiments, the anisotropic force is applied uniformly over the surface of the component.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example a surface of a protective structure of an electrode, is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

In some embodiments, the anisotropic force can be applied such that the magnitude of the force is substantially equal in all directions within a plane defining a cross-section of the electrode (or electrochemical cell), but the magnitude of the forces in out-of-plane directions is substantially unequal to the magnitudes of the in-plane forces. For example, a cylindrical band may be positioned around the exterior of a cell such that forces are applied to the cell oriented toward the cell's central axis. In some embodiments, the magnitudes of the forces oriented toward the central axis of the cell are different (e.g., greater than) the magnitudes of the forces applied in out of plane directions.

As described herein, articles described herein may be constructed and arranged to apply, during at least one period of time during charge and/or discharge, an anisotropic force with a component normal to a surface of the article. Those of ordinary skill in the art will understand the meaning of this. In such an arrangement, the article may be formed as part of a container which applies such a force by virtue of a "load" applied during or after assembly of an electrode or electrochemical cell, or applied during use of the electrode or cell as a result of expansion and/or contraction of one or more portions of the cell itself.

The magnitude of the applied force is, in some embodiments, large enough to enhance the formation process of an electrode when it is applied during electrode formation. The components of the electrode (and/or electrochemical cell) and the anisotropic force may be, in some instances, together selected such that the anisotropic force affects surface morphology of the electroactive layer being formed (e.g., reducing the amount of "mossy" formations in such a layer). In some embodiments, the application of force during formation of an electroactive layer results in a smoother electroactive layer being formed compared to the formation of the electroactive layer in the absence of such a force. A smoother distribution of the electroactive layer may also be formed. These qualities may lead to improved current distribution over the entire surface of the electroactive layer, and may enhance cycle life of the electrochemical cell incorporating such a layer.

In other embodiments, the magnitude of the applied force may be large enough to enhance performance of the electrochemical cell. The applied force may be used to inhibit increase in the electroactive layer surface area through charge and discharge wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

The magnitude of the anisotropic force may be selected based, at least in part, on the material composition of the electroactive layer formed or to be formed (e.g., since the force may also be applied to the electroactive layer during and after formation of the layer) and/or the yield strength of the electroactive material. For example, where the surface of the electroactive layer is relatively softer, the component of the force normal to the surface of the electroactive layer may be selected to be lower. Where the surface of the electroactive layer is harder, the component of the force normal to the active surface may be greater. Those of ordinary skill in the art can easily select anode materials, alloys, mixtures, etc. with known or predictable properties, or readily test the hardness or softness of such surfaces, and readily select cell construction techniques and arrangements to provide appropriate forces to achieve what is described herein. Simple testing can be done, for example by arranging a series of active materials, each with a series of forces applied normal (or with a component normal) to the surface of the electroactive layer, to determine the morphological effect of the force on the surface without cell cycling (for prediction of the selected combination during cell cycling) or with cell cycling with observation of a result relevant to the selection.

The component of the anisotropic force normal to a surface of the electrode or electrochemical cell may define a pressure of between, for example, 2 to 200 Newtons per square centimeter (e.g., between 2 and 100 Newtons per square cm, between 10 and 100 Newtons per square cm, between 20 and 150 Newtons per square cm, between 49 and 117.6 Newtons per square cm, between 68.6 and 98 Newtons per square cm, between 50 to 150 Newtons per square cm, or between 50 to 100 Newtons per square cm). In some embodiments, the component of the anisotropic force normal to a surface of the electrode or electrochemical cell may, for example, define a pressure of at least 4.9, at least 5, at least 9.8, at least 10, at least 14.7, at least 15, at least 19.6, at least 20, at least 24.5, at least 25, at least 29.4, at least 30, at least 34.3, at least at least 39, at least 40, at least 45, at least 49, at least 50, at least 60, at least 70, at least 75, at least 78, at least 85, at least 98, at least 100, at least 105, at least 110, at least 115, at least 117.6, at least 120, at least 125, at least 130, at least 135, at least 140, at least 145, or at least 147, at least 150, at least 155, at least 160, at least 170, at least 180, at least 190, or at least 200 Newtons per square centimeter. In some embodiments, the component of the anisotropic force normal a surface of the electrode or electrochemical cell may, for example, define a pressure of less than 200, less than 196, less than 180, less than 170, less than 160, less than 150, less than 147, less than 140, less than 130, less than 120, less than 117.6, less than 100, less than 98, less than 90, less than 80, less than 70, less than 60, less than 50, less than 49, less than 25, less than 24.5, less than 10, or less than 9.8 Newtons per square centimeter. Other ranges, and combinations of the above-noted ranges are also possible (e.g., a pressure of at least 50 and less than 100 Newtons per square centimeter).

In some embodiments, the component of the anisotropic force normal to a surface of the electrode or electrochemical cell may define a pressure that is at least 0.5 times, at least 0.7 times, at least 1.0 times, 1.25 times, at least 1.5 times, at least 1.75 times, at least 2.0 times, at least 2.5 times, or at least 3.0 times the yield strength of the anode active material (e.g., lithium). Such magnitudes can be easily calculated since yield strength is an inherent property of a material.

While forces and pressures are generally described herein in units of Newtons and Newtons per unit area, respectively, forces and pressures can also be expressed in units of kilograms-force and kilograms-force per unit area, respectively. One or ordinary skill in the art will be familiar with kilogram-force-based units, and will understand that 1 kilogram-force is equivalent to about 9.8 Newtons.

In some cases, one or more forces applied to the cell may have a component that is not normal to a surface of an electrode or electrochemical cell. For example, in FIG. 1, force 60 is not normal to a surface of the electrode. In one set of embodiments, the sum of the components of all applied anisotropic forces in a direction normal to a surface of the electrode or electrochemical cell is larger than any sum of components in a direction that is non-normal to the surface of the electrode or electrochemical cell. In some embodiments, the sum of the components of all applied anisotropic forces in a direction normal to the surface of the electrode or electrochemical cell is at least 5%, at least 10%, at least 20%, at least 35%, at least 50%, at least 75%, at least 90%, at least 95%, at least 99%, or at least 99.9% larger than any sum of components in a direction that is parallel to the surface of the electrode or electrochemical cell.

In some embodiments, the cathode and anode have yield stresses, wherein the effective yield stress of one of the cathode and anode is greater than the yield stress of the other, such that an anisotropic force applied normal to the surface of one of the active surface of the anode and the active surface of the cathode causes the surface morphology of one of the cathode and the anode to be affected. In some embodiments, the component of the anisotropic force normal to the anode active surface (or a surface of an anode that does not include an electroactive material) is between 20% and 200% of the yield stress of the anode active material, between 50% and 120% of the yield stress of the anode active material, or between 80% and 100% of the yield stress of the anode active material.

The anisotropic force described herein may be applied using any method known in the art. In some embodiments, the force may be applied using compression springs. For example, referring to FIG. 2, the cell may be situated in an optional enclosed containment structure 156 with one or more compression springs situated between surface 154 and the adjacent wall of the containment structure to produce a force with a component in the direction of arrow 62. In some embodiments, the force may be applied by situating one or more compression springs outside the containment structure such that the spring is located between an outside surface 158 of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, hydraulic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, cells may be pre-compressed before they are inserted into containment structures, and, upon being inserted to the containment structure, they may expand to produce a net force on the cell. Such an arrangement may be advantageous, for example, if the cell is capable of withstanding relatively high variations in pressure. In such embodiments, the containment structures may comprise a relatively high strength (e.g., at least 100 MPa, at least 200 MPa, at least 500 MPa, or at least 1 GPa). In addition, the containment structure may comprise a relatively high elastic modulus (e.g., at least 10 GPa, at least 25 GPa, at least 50 GPa, or at least 100 GPa). The containment structure may comprise, for example, aluminum, titanium, or any other suitable material.

In some cases, any of the forces described herein may be applied to a plurality of electrodes or electrochemical cells (i.e., articles) in a stack. As used herein, a "stack" of articles is used to refer to a configuration in which multiple articles are arranged in an essentially article-repetitive pattern, e.g., positioned on top of one another. In some cases, the articles may be positioned such that at least one surface of each article in the stack is substantially parallel to at least one surface of every other article in the stack, e.g., where a surface of one particular component of an article (e.g., the anode) is substantially parallel to the same surface of the same component of other articles. In some embodiments, the articles may be in direct contact with one another, while in some instances one or more spacers may be positioned between the articles in a stack. The stack may include any suitable number of articles (e.g., between 2 and 1,000 articles). In some cases, a stack includes at least 2, at least 3, at least 5, at least 10, at least 25, at least 100 articles, or more.

In some embodiments, a constricting element may surround at least a portion of an article or a stack of articles. The constricting element may be constructed and arranged, in some cases, to apply an anisotropic force with a component normal to at least one surface within the article or stack of articles defining a pressure having a magnitude described herein.

In some embodiments, the constricting element may comprise a band (e.g., an elastic band, a turnbuckle band, etc.). In some embodiments, a band can be affixed to an article or stack by, for example adhesive, staples, clamps, a turn-buckle, or any other suitable method. In some cases, the band comprises a turnbuckle band (e.g., a Kevlar turnbuckle band), and force is applied by tightening the band and securing the turnbuckle. In some instances, the band is a continuous elastic band. In some cases, after the elastic band is stretched and positioned around the article(s), a force may be applied via the elastic constriction of the band. As a specific example, a band can be installed by cooling the band material below its martensitic transformation temperature and plastically deforming (e.g., via stretching) the band to fit over the article or stack of articles. Upon returning to operating temperature, the band could then shrink to its pre-formed shape, by which the band could apply a force.

The constricting element may comprise any suitable material with an amount of elasticity necessary to produce the desired force. A solid band of elastic material can be sized such that it provides required external pressure upon being applied to the outer surface of the article(s). In some cases, the constricting element may comprise a polymeric material. The constricting element may comprise, for example, Desmopan® 392 (a polyester urethane, made by Bayer MaterialScience, Leverkusen, Germany), Estane® (an engineered polymer made by The Lubrizol Corporation, Wickliffe, Ohio), Kevlar® (a synthetic fiber made by DuPont, Wilmington, Del.), among others. In some embodiments, the constricting element may comprise a shape memory alloy (e.g., nitinol (NiTi)), which may expand and contract upon varying the temperature to which the material is exposed. In some cases, the constricting element can comprise shrink wrap tubing such as, for example, polyester film and/or fabric.

In some embodiments, the mass density of the elements (e.g., a constricting element, an expanding element, etc.) used to apply a force to an article or stack of articles is relatively low. By using elements with relatively low mass densities, the energy density and specific energy of the article or stack of articles may remain relatively high. In some embodiments the mass density of the element(s) used to apply a force to an article or a stack of articles is less than 10 g/cm$^3$, less than 5 g/cm$^3$, less than 3 g/cm$^3$, less than 1 g/cm$^3$, less than 0.5 g/cm$^3$, less than 0.1 g/cm$^3$, between 0.1 g/cm$^3$ and 10 g/cm$^3$, between 0.1 g/cm$^3$ and 5 g/cm$^3$, or between 0.1 g/cm$^3$ and 3 g/cm$^3$.

In some embodiments, pressure distribution components may be included between an article and another article or between an article and a constricting element. Such pressure distribution components can allow for a uniform force to be applied throughout the article or stack of articles. Examples of pressure distribution components include end caps and spacers. These and other components involved in applying a force to an article or a stack of articles are described in more detail in U.S. patent application Ser. No. 12/535,328, filed Aug. 4, 2009, published as U.S. Pub. No. 2010/0035128, and entitled "Application of Force In Electrochemical Cells".

Pressure distribution components and constriction elements are not limited to flat cell geometries, and in some instances, they may be used to apply a force to a cylindrical article (e.g., electrochemical cell), a prismatic article (e.g., a triangular prism, a rectangular prism, etc.), or articles of other shapes. For example, in some embodiments, one or more wraps of the same or different winding material may be positioned on the outside surface of the article. In some embodiments, the winding material comprises relatively high strength. The winding material may also comprise a relatively high elastic modulus. In some cases, shrink wrap tubing such as polyester film and fabric. In some cases, the constriction element comprises an elastic material properly sized to provide required external pressure after it relaxes on the outer surface of the article.

In some embodiments, the article may comprise an expanding element (e.g., an expanding mandrel) within an inner volume of the article such that the expanding element apply a force radiating outward from the inner volume of the article. In some embodiments, the expanding element and the constricting element can be constructed and arranged such that the force within the boundaries of the article deviates by less than 30%, less than 20%, less than 10%, or less than 5% of the median force within the boundaries of the article. In some embodiments, such a distribution of forces can be achieved, for example, by selecting constricting and expanding elements such that substantially equal internal and external forces per unit area are applied to the article.

In some embodiments, rather than applying internal pressure, external pressure application can be combined with complimentary winding mechanics to achieve a radial pressure distribution that is within acceptable bounds. For example, proper surface nip winding (e.g., using a nip roller) can produce a radial pressure distribution varying from 107.9 Newtons/cm$^2$ at the inner diameter to 0 Newtons/cm$^2$ at the outer diameter of the cell. The contracting element may be constructed and arranged to produce a force of 0 Newtons/cm$^2$ at the inner diameter and 78.5 Newtons/cm$^2$ at the outer diameter. The superposition of these two distributions can result in a mean pressure application of 98 Newtons/cm$^2$ with a variation of ±19.6 Newtons/cm$^2$.

In some embodiments, the total volumes of the pressure distribution elements(s) (e.g., end caps, spacers, etc.) and the element(s) used to apply a force to the cell or stack of cells (e.g., bands, mandrels, etc.) may be relatively low. By employing low volumes, the energy density of the assembly may be kept relatively high. In some cases, the sum of the volumes of the pressure distribution element(s) and the element(s) used to apply a force to an article or stack of articles comprises less than 10%, less than 5%, less than 2%, less than 1%, less than 0.5%, less than 0.1%, between 0.1% and 10%, between 0.1% and 5%, between 0.1% and 2%, or between 0.1% and 1% of the volume of the article or stack of articles.

In some cases, the articles described herein may change size (e.g., swell) during charge and discharge, or during formation of the article (e.g., a layer within the article). When selecting the method of applying the anisotropic force, it may be desirable, in some embodiments, to select methods that produce a relatively constant force as the article changes shape and/or size during charge and discharge, or during formation. In some instances, this selection may be analogous to selecting a system with a low effective spring constant (e.g., a "soft" spring). For example, when using a compression spring to apply the anisotropic force, a spring with a relatively low spring constant may produce an anisotropic force that is more constant during charge/discharge than the force produced by a spring with a relatively high spring constant. In cases where elastic bands are used, a band with a relatively high elasticity may produce an anisotropic force that is more constant during charge/discharge than the force produced by a band with a relatively low elasticity. In some embodiments in which force is applied using a machine screw, the use of soft screws (e.g., brass, polymer, etc.) may be advantageous. In some applications, for example, a machine screw may be selected to cover a desired range of compression, but the screw itself may be soft.

In some embodiments, the articles described herein are placed in containment structures, and at least a portion of an anisotropic force with a component normal to a surface of the article is produced due to the expansion of the article relative to the containment structure. In some cases, the containment structure is sufficiently rigid such that it does not deform during the expansion of the article, resulting in a force applied on the article. The article may swell as the result of a variety of phenomena. For example, in some cases, the article may undergo thermal expansion. In some embodiments, the article may swell due to charge and/or discharge. For example, in some cases, a partially or fully discharged cell may be placed in a containment structure. Upon charging the discharged cell, the cell may swell. In other embodiments, expansion may take place due to the formation of a layer (e.g., an electroactive layer) within the article. Expansion in these scenarios may be limited by the dimensions of the containment structure, resulting in the application of an anisotropic force.

In some cases, the article may swell due to the adsorption of a liquid into porous components of the article. For example, in some embodiments, an article including a dry porous layer may be placed within a containment structure. The dry porous layer may then be soaked (e.g., with a liquid electrolyte). In some cases, the properties of the electrolyte (e.g., surface tension) and the article (e.g., size of the porous cavities) may be selected such that, when the article is wetted by the electrolyte, a desirable level of capillary pressure is generated. Once wetted, the article may swell, thus generating an anisotropic force. At equilibrium, the anisotropic force exerted by the containment structure on the article will be equal to the force resulting from the capillary pressure.

Containment structures described herein may comprise a variety of shapes including, but not limited to, cylinders, prisms (e.g., triangular prisms, rectangular prisms, etc.), cubes, or any other shape. In some embodiments, the shape of the containment structure is chosen such that the walls of the containment structure are parallel to the outer surfaces of the article. For example, in some cases, the containment structure may comprise a cylinder, which can be used, for example, to surround and contain a cylindrical electrolytic cell. In other instances, the containment structure may comprise a prism surrounding a similarly shaped prismatic electrolytic cell.

In some embodiments, aspects of the invention relate to the discovery that the application of a force as described herein may allow for the use of smaller amounts of anode active material (e.g., lithium) and/or electrolyte within an electrode or an electrochemical cell, relative to the amounts used in essentially identical electrodes or cells in which the force is not applied. In cells lacking the applied force described herein, anode active material (e.g., lithium metal) may be, in some cases, redeposited unevenly on an anode during charge-discharge cycles of the cell, forming a rough surface (e.g., a "mossy" morphology). In some cases, this may lead to an increase in the rates of one or more undesired reactions involving the anode metal. These undesired reactions may, after a number of charge-discharge cycles, stabilize and/or begin to self-inhibit such that substantially no additional anode active material becomes depleted and the cell may function with the remaining active materials. For cells lacking the applied force as described herein, this "stabilization" is often reached only after a substantial amount of anode active material has been consumed and cell performance has deteriorated. Therefore, in some cases where forces as described herein have not been applied, a relatively large amount of anode active material and/or electrolyte has often been incorporated within cells to accommodate for loss of material during consumption of active materials, in order to preserve cell performance.

Accordingly, the application of force as described herein may reduce and/or prevent depletion of active materials such that the inclusion of large amounts of anode active material and/or electrolyte within the electrochemical cell may not be necessary. The application of force may, for instance, suppress the development of a "mossy" surface. For example, the force may be applied to a cell prior to use of the cell, or in an early stage in the lifetime of the cell (e.g., less than 15, 10, or 5 charge-discharge cycles), such that little or substantially no depletion of active material may occur upon charging or discharging of the cell. By reducing and/or eliminating the need to accommodate for active material loss during charge-discharge of the cell, relatively small amounts of anode active material may be used to fabricate electrodes, cells and devices as described herein. In some embodiments, the invention relates to devices comprising an electrochemical cell having been charged and discharged less than 15, 10, or 5 times in its lifetime, wherein the cell comprises an anode, a cathode, and an electrolyte, wherein the anode comprises no more than 5 times the amount of anode active material which can be ionized during one full discharge cycle of the cell. In some cases, the anode comprises no more than 4, 3, 2, or 1.5 times the amount of lithium which can be ionized during one full discharge cycle of the cell.

A variety of materials and arrangements can be used in individual assemblies described and illustrated herein, or in all of the assemblies. It is to be understood that where a particular component or arrangement is described in connection with one embodiment or figure, that component or arrangement can be used in connection with any others.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; U.S. patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. Provisional patent application Ser. No. 12/862,528, filed on Aug. 24, 2010, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur" [S1583.70029US00]; U.S. patent application Ser. No. 12/862,551, filed on Aug. 24, 2010, published as U.S. Pub. No. 2011/0070491, entitled "Electrochemical Cells Comprising Porous Structures Comprising Sulfur" [S1583.70030US00]; U.S. patent application Ser. No. 12/862,576, filed on Aug. 24, 2010, published as U.S. Pub. No. 2011/0059361, entitled "Electrochemical Cells Comprising Porous Structures Comprising Sulfur" [S1583.70031US00]; U.S. patent application Ser. No. 12/862,581, filed on Aug. 24, 2010, published as U.S. Pub. No. 2011/0076560, entitled "Electrochemical Cells Comprising Porous Structures Comprising Sulfur" [S1583.70024U501]; U.S. Patent Apl. Ser. No. 61/385,343, filed on Sep. 22, 2010, entitled "Low Electrolyte Electrochemical Cells", and published as U.S. Pub. No. 2012/0070746 [S1583.70033US00]; and U.S. patent application Ser. No. 13/033,419, filed Feb. 23, 2011, entitled "Porous Structures for Energy Storage Devices", and published as U.S. Pub. No. 2011/0206992 [S1583.70034US00]. All other patents and patent applications disclosed herein are also incorporated by reference in their entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of forming an electrode, comprising:
   providing an article comprising a current collector and a protective structure, wherein the protective structure is separated from the current collector by one or more intervening layers, wherein the one or more intervening layers have a total thickness of less than 2 microns;
   providing a source of alkali metal ions, wherein the source of alkali metal ions is a layer of alkali metal positioned on a side of the protective structure opposite the current collector;
   transporting the alkali metal ions from the source across the protective structure; and
   forming an electroactive layer comprising an alkali metal between the current collector and the protective structure,
   wherein an anisotropic force, having a component normal to a surface of the article, is applied to the article, the component defining a pressure of at least 50 Newtons/cm$^2$.

2. A method as in claim 1, wherein the protective structure is separated from the current collector by one or more intervening layers, and wherein the intervening layer comprises a material suitable for intercalating an alkali metal ion.

3. A method as in claim 1, wherein the protective structure is separated from the current collector by one or more intervening layers, and wherein the intervening layer comprises a carbon-containing material.

4. A method as in claim 1, wherein the article, prior to the step of transporting the alkali metal ions from the source across the protective structure, does not include an alkali metal.

5. A method as in claim 1, wherein the article, prior to the step of transporting the alkali metal ions from the source across the protective structure, has not been cycled.

6. A method as in claim 1, wherein the protective structure is a multi-layered structure comprising at least two layers of different material composition.

7. A method as in claim 1, wherein the one or more intervening layers between the current collector and the protective structure comprises lithium metal used as a seed layer for forming an electroactive layer.

8. A method as in claim 1, wherein the article, prior to the step of transporting the alkali metal ions from the source across the protective structure, further comprises a cathode, and wherein the one or more intervening layers between the current collector and the protective structure comprising lithium metal is present in an amount that is insufficient to participate in a full discharge of the article.

9. A method as in claim 1, wherein the article further comprises a layer of alkali metal positioned adjacent the protective structure on a side opposite the current collector.

10. A method as in claim 1, wherein the article further comprises a cathode, and wherein the cathode comprises the source of alkali metal ions.

11. A method as in claim 1, wherein the component normal to the surface of the article is defined by a pressure of at least 60 Newtons/cm$^2$.

12. A method as in claim 1, wherein the protective structure comprises a single-ion conductive layer comprising lithium nitride and/or a lithium oxide.

13. A method as in claim 1, wherein the protective structure comprises a single-ion conductive layer comprising pores and at least a portion of the pores are filled with a polymer.

14. A method as in claim 1, wherein the article is adapted and arranged for use in a lithium ion electrochemical cell.

15. A method as in claim 1, wherein the transporting step comprises charging the article at a rate of between 4 C and C/10.

16. A method as in claim 1, wherein the anisotropic force includes a component defining a pressure having a magnitude of 0.5 times to 3 times the yield strength of lithium metal.

17. A method as in claim 1, wherein the article comprises a cathode, and wherein the layer of alkali metal is positioned adjacent the cathode.

18. A method as in claim 17, wherein the cathode comprises a lithium-containing transition metal oxide, a lithium-containing metal oxide, a lithium-containing phosphate and/or an lithium intercalation compound.

19. A method as in claim 1, wherein the layer of alkali metal is a lithium metal layer.

20. A method as in claim 1, wherein the article comprises a cathode and a separator, and wherein the layer of alkali metal is positioned between the cathode and the separator.

* * * * *